United States Patent [19]
Lee et al.

[11] Patent Number: 5,596,236
[45] Date of Patent: Jan. 21, 1997

[54] MOTOR CAPABLE OF USING HIGH OR LOW VOLTAGE

[75] Inventors: Jin-Bang Lee; Byung-Cheol Choi, both of Incheon; Nam-Ho Lee; Seon-Kyu Kim, both of Seoul, all of Rep. of Korea

[73] Assignee: Daewoo Electronics Co., Ltd., Seoul, Rep. of Korea

[21] Appl. No.: 254,078

[22] Filed: Jun. 6, 1994

[30] Foreign Application Priority Data

| Jun. 7, 1993 | [KR] | Rep. of Korea | 93-10258 |
| Jul. 12, 1993 | [KR] | Rep. of Korea | 93-13076 |
| Jul. 20, 1993 | [KR] | Rep. of Korea | 93-13724 |
| Aug. 11, 1993 | [KR] | Rep. of Korea | 93-15531 |
| Sep. 28, 1993 | [KR] | Rep. of Korea | 93-20179 |
| Dec. 14, 1993 | [KR] | Rep. of Korea | 93-27706 |

[51] Int. Cl.$^6$ ............... H02K 11/00; H02P 7/74; H01H 9/00
[52] U.S. Cl. .......... 310/68 A; 318/109; 318/497; 200/1 A
[58] Field of Search ............ 310/71, 142, 136, 310/140, 148, 149, 68 A, 151, 184, 198; 318/497, 526, 440, 442, 106, 109; 200/1 R, 1 A, 16 R, 16 A, 16 C, 16 D

[56] References Cited

U.S. PATENT DOCUMENTS

| 549,153 | 11/1895 | Potter | 318/109 |
| 1,231,573 | 7/1917 | Davis | 318/442 |
| 1,389,150 | 8/1921 | Meyer | 318/476 |
| 1,506,754 | 9/1924 | Hutchinson | 318/109 |
| 2,664,473 | 12/1953 | Brown | 318/497 |
| 2,758,169 | 8/1956 | Weide | 200/16 A |
| 2,807,766 | 9/1957 | Moody et al. | 318/442 |
| 4,233,478 | 11/1980 | Stahl et al. | 200/1 A |
| 4,429,935 | 2/1984 | Lamb et al. | 318/442 |
| 4,550,232 | 10/1985 | Lemmer | 200/16 A |

FOREIGN PATENT DOCUMENTS

| 55-162868 | 12/1980 | Japan | 310/68 A |

*Primary Examiner*—Clayton E. LaBalle
*Attorney, Agent, or Firm*—Nixon & Vanderhye

[57] ABSTRACT

A motor comprises an armature, first and second commutators disposed at either side of the armature, first and second amateur coils wound on the armature through commutator pieces in a double winding back alpha type, and first and second stator coil groups respectively connected through brushes to first and second commutators. A first circuit formed of the first stator coil group, the first commutator, and the first armature coil is connected to a second circuit formed of the second armature coil, the second commutator, and the second stator coil group, in series or in parallel corresponding to a high voltage or a low voltage applied to the motor, thereby the motor shows the same output power without relation to the voltage applied thereto.

9 Claims, 24 Drawing Sheets

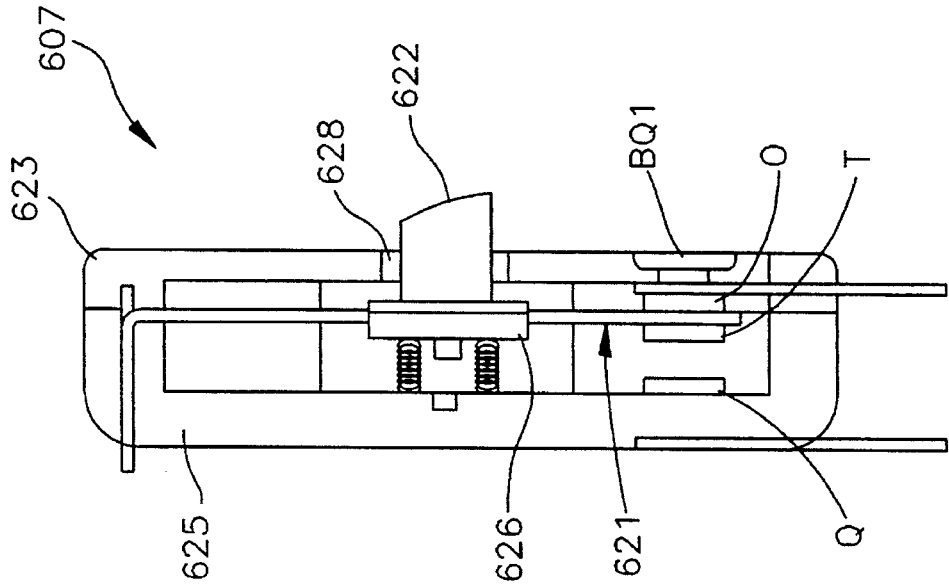
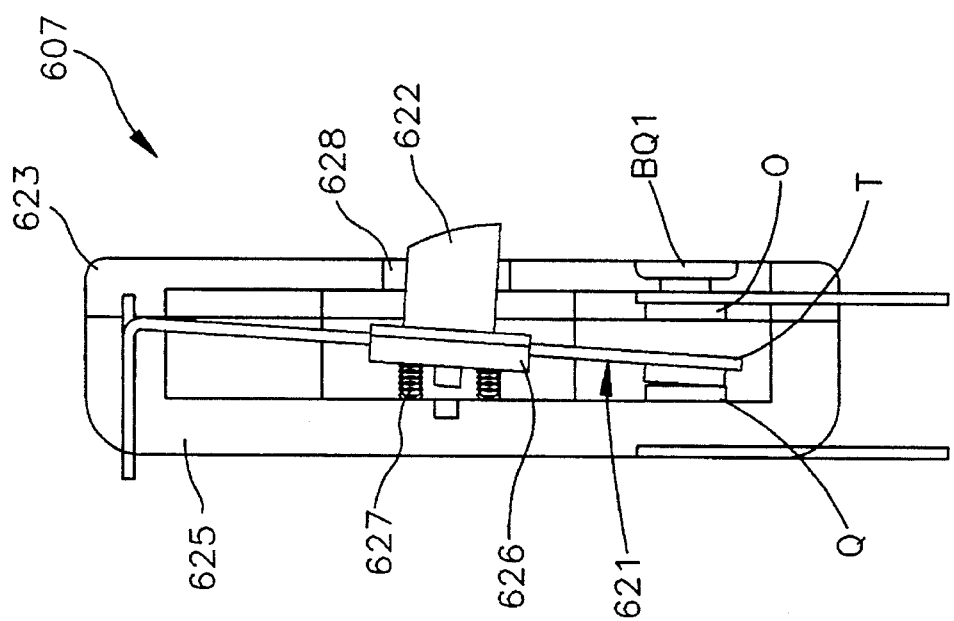

FIG. 28
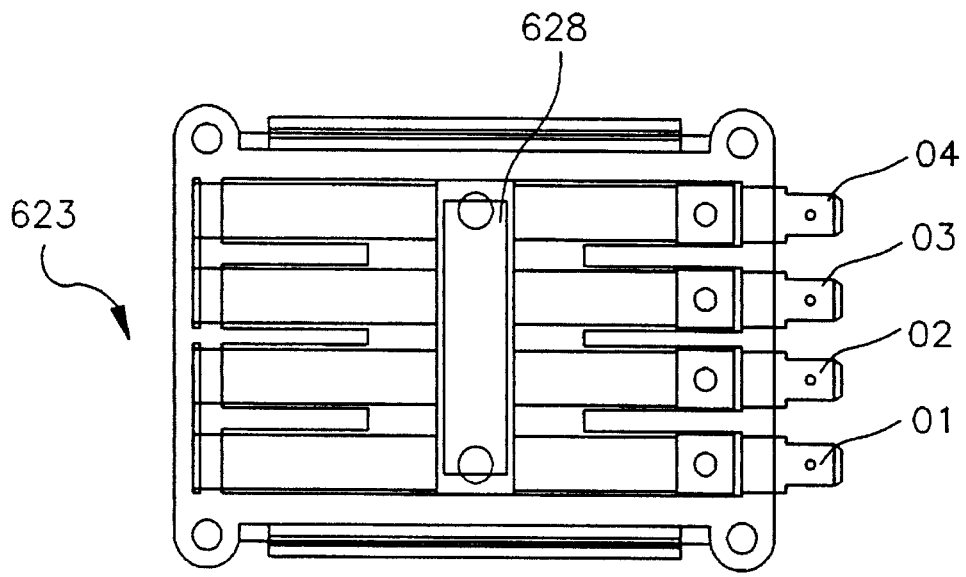
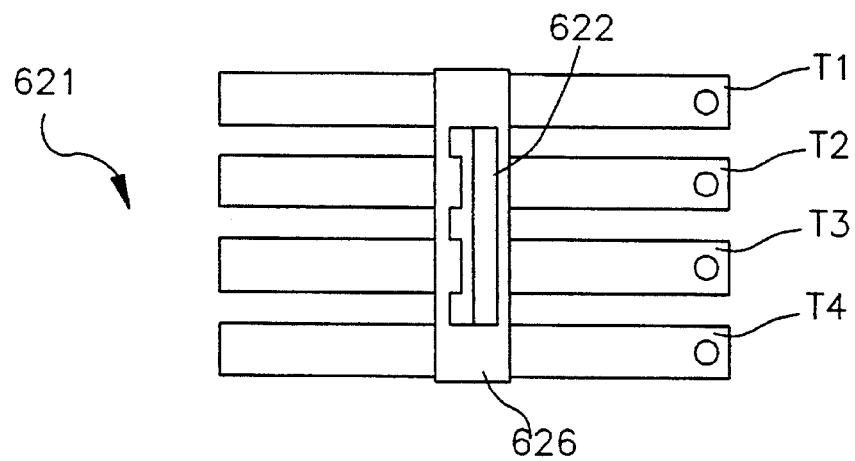
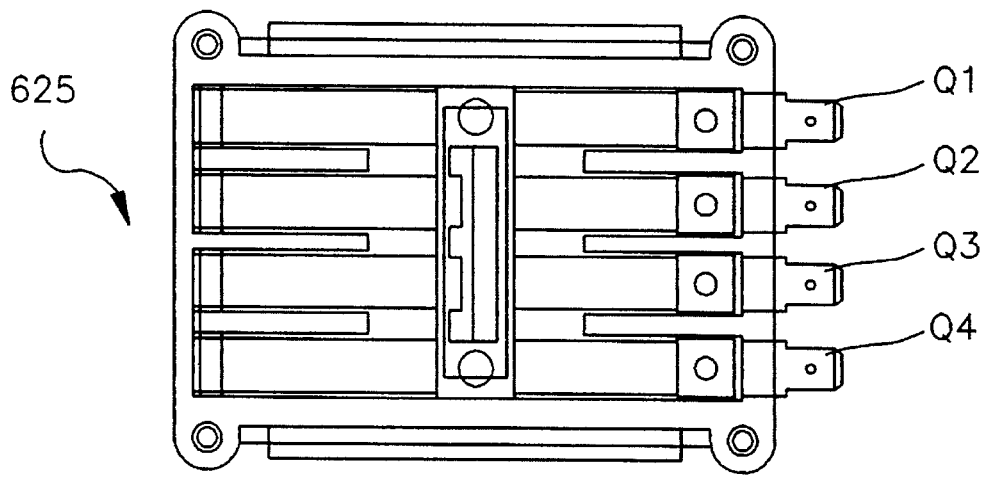

MOTOR CAPABLE OF USING HIGH OR LOW VOLTAGE

BACKGROUND OF THE INVENTION

1. Field of the Invention

The present invention relates to a motor for an electrical system, and more particularly to a motor which can be driven by a low or high voltage supplier without providing an additional apparatus such as a transformer.

2. Description of Prior Arts

Generally, electrical apparatuses are divided into two groups, that is, those which can be driven by an alternating current supplier and the others which can be driven by a direct current supplier. The other is a cordless type vacuum cleaner wherein a battery which is provided therein and produces a direct current at a low voltage when compared to that of the wire type vacuum cleaner, is used as a current supplier without using the alternating current supplier. In a conventional wire type vacuum cleaner, a universal motor which can be driven by a direct or an alternating current supplier is used. In the meantime, the cordless vacuum cleaner uses a small motor which is driven by a direct current supplier.

FIG. 1 is a schematic diagram for illustrating a universal motor used in a conventional electrical apparatus. As shown in FIG. 1 a commutator 103 is secured to the lower portion of a shaft 102 of an armature 101. Two brushes 104a and 104b are provided on both sides of commutator 103 so as to come in contact with commutator 103. The ends of two stator coil groups 105a and 105b which are wound on stators (not shown) are connected to brushes 104a and 104b, respectively. Further, two electrical source nodes P1 and P2 are connected to the other ends of stator coil groups 105a and 105b, respectively.

FIG. 2 is a schematic diagram showing a group of armature coil 101 which is wound on pieces of commutator 103 and in slots formed on the core surface portion of armature 101 in a conventional motor as shown in FIG. 1. As shown in FIG. 2, armature coil 101a is wound between on twenty two slots of armature 101 and on twenty-two commutator pieces according to a double winding back alpha method. Here, double winding is referred to a method of winding a coil wherein armature coil 101a is inserted in a single slot and wound on armature 101 in both directions along the longitudinal direction of armature 101 so that armature coil 101a forms a closed circuit. Back alpha is referred to winding type wherein armature coil 101a is connected to a hook of a commutator piece. More particularly with reference to FIG. 2, armature coil 101a which is connected to a commutator piece a1 in an alpha type, is wound through slots 1 and 12 of armature 101 in a longitudinal direction thereof by a predetermined number of turnings and then connected to a commutator piece a2 in an alpha type. Armature coil 101a is wound through slots 2 and 13 of armature 101 by the same number of turnings. In the same manner, armature coil 101a is further wound through each slot and finally amateur coil 101a is wound from slot 22 to slot 11 and connected to commutator a11 so that the entire armature coil 101 forms a closed circuit. At each slot of armature 101, two armature coils are wound in the opposite directions by the same number of turnings.

In the meantime, the number of turnings of armature coil 101a determines the power of the motor.

With reference to FIG. 3, an operation of the conventional motor will be explained. At first, when a plus current source is applied to node P1, a current passes through stator coil 105a and brush 104a. Then, the current is applied to armature coil 101a through the hook of the commutator pieces and passes through stator coil 105 of the other side and flows to a current node P2.

Accordingly, the shaft of the stator comes to have an N pole and a P pole in accordance with the direction of the current to produce a magnetic field. Due to the relation between the current direction of armature coil 101a (inserted in the slot of the armature core 101) and the polarity of the shaft, a rotation power is produced according to Fleming's left hand rule. Thus, armature 101 starts to rotate. If the amateur rotates, the contact portions between commutator 103 as a rotator and brushes 104a and 104b as a stator changes continuously so that the current supplying point to armature coil 101a is continuously shifted in accordance with the formation of the slots of the armature core. However, the current direction is not changed independently of the shift of the current supplying point, the armature continues to rotate in a predetermined direction during the supply of the current.

Here, the rotating direction is determined by the winding direction of stator coils 105a and 105b or the connection between armature 101 and commutator 103. In a conventional universal motor as above, the rotating direction remains unchanged although an alternating current source is applied instead of the direct current source. That is, when the alternating current is applied so that the current direction is changed, the magnetic field direction formed by the stator coil is also changed according to the current direction change. Therefore, the rotating direction of the armature is unchanged. Due to this fact, the universal motor can be driven either by a direct current source or by an alternating current source.

Generally, the alternating current source which is publicly used is a high voltage source such as 110 V or 220 V (there is a difference according to an individual nation). However, a unit cell constituting a battery for producing a direct current can not provide a voltage more than 2 V. Therefore, batteries wherein a plurality of unit cells are connected in series for providing a low voltage such as 12 V, 24 V, 48 V etc. are commercially available.

Therefore, in order to obtain a voltage as high as the public alternating current by using only the battery, a plurality of batteries should be connected in series. In such a case, the number of the batteries and the weight of the power source should be increased proportionally. In a small electrical apparatus such as a conventional vacuum cleaner, there must be a limitation in view of the size and the weight thereof. Therefore, the vacuum cleaner should be divided into one wherein an alternating current source is used and the other wherein a direct current source is used. That is, in a vacuum cleaner wherein the alternating current source is used, a motor having an appropriate coil for the high voltage alternating current source is used so as to produce a desired power. In the meantime, in a vacuum cleaner wherein a battery is used as an electrical power source, a cord for an alternating current power source is not used and a motor producing a desired power at a low voltage is used so that the size and the weight of the battery may be reduced. Accordingly, in a conventional vacuum cleaner for household appliance, one wherein a motor for only a public high voltage is provided is used when a public high voltage is used at home, and another wherein a motor only for a low direct voltage from a small number of batteries is used when a motor for battery is used as an electrical power source. Therefore, in a small electrical apparatus such as a vacuum cleaner, either a high voltage or a low voltage should be used as a power source and producing an electrical apparatus wherein both a high voltage source such as the public alternating power source and a low voltage source such as a battery may be used alternatingly was impossible.

SUMMARY OF THE INVENTION

The present invention has been made to overcome the above described problems, and therefore it is an object of the present invention to provide a motor capable of using various voltages which can be driven by a power of low or high voltage.

It is another object of the present invention to provide a motor capable of using various voltages which includes a switch section for changing the connections in a circuit of the motor corresponding to a high or low voltage.

To achieve the above objects, the present invention provides a motor capable of using various voltages comprising:

a cylindrical armature having a plurality of slots formed at an outer surface thereof;

a rotation shaft passing through the center of the armature for rotating the armature;

a first and a second commutator disposed at the opposite ends of the rotation shaft in the opposite sides of the armature, and respectively including a first and a second plurality of commutator pieces, the numbers of which are respectively corresponding to that of the slots of the armature;

a first and a second armature coil wound in the armature slots respectively through the first and the second commutator pieces in a double-winding-back-alpha type;

a first and a second brush disposed at the opposite sides of the first commutator and being in contact with the first commutator pieces, and a third and a fourth brush disposed at the opposite sides of the second commutator and being in contact with the second commutator pieces; and a first and a second stator coil group wound on stators fixed at the housing of the motor, and respectively interconnected to the first and the second brush, the first stator coil group, the first commutator, and the first armature coil being connected in series to form a first circuit;

the first stator coil group, the first commutator, and the first armature coil being connected in series to form a first circuit, and the second armature coil, the second commutator, and the second stator coil group being connected in series to form a second circuit; and the first circuit being connected to the second circuit in series corresponding to a first voltage applied to the motor, and in parallel corresponding to a second voltage applied to the motor, which is lower than the first voltage.

Preferably, a motor capable of using various voltages of the present invention may further comprise switching means for connecting the first circuit and the second circuit in series corresponding to high voltage, and in parallel corresponding to low voltage, applied to the motor.

According to the above construction of the present invention, the first circuit and the second circuit are interconnected in series or in parallel with each other, corresponding to a power inputted, and thereby the load in the circuits in parallel, to which a low voltage is applied, is a half of the load in circuits connected in series, to which a high voltage is applied, while sum of the number of turnings of the first and the second armature coil is constant without relation to the connections of the circuits.

Therefore, a motor according to the present invention shows the same rotating force when a low voltage is applied thereto, with that, when a high voltage is applied thereto.

BRIEF DESCRIPTION OF THE DRAWINGS

The above objects, and other features and advantages of the present invention will be apparent by describing the preferred embodiments with reference to the accompanying drawings, in which;

FIGS. 27A and B, respectively, schematically show a switching section according to the embodiment shown in FIG. 26, respectively when a battery is and is not installed on the body of the cleaner;

FIG. 28 is plan views of several components in the switching section shown in FIG. 26;

DESCRIPTION OF THE PREFERRED EMBODIMENTS

Figure 1:
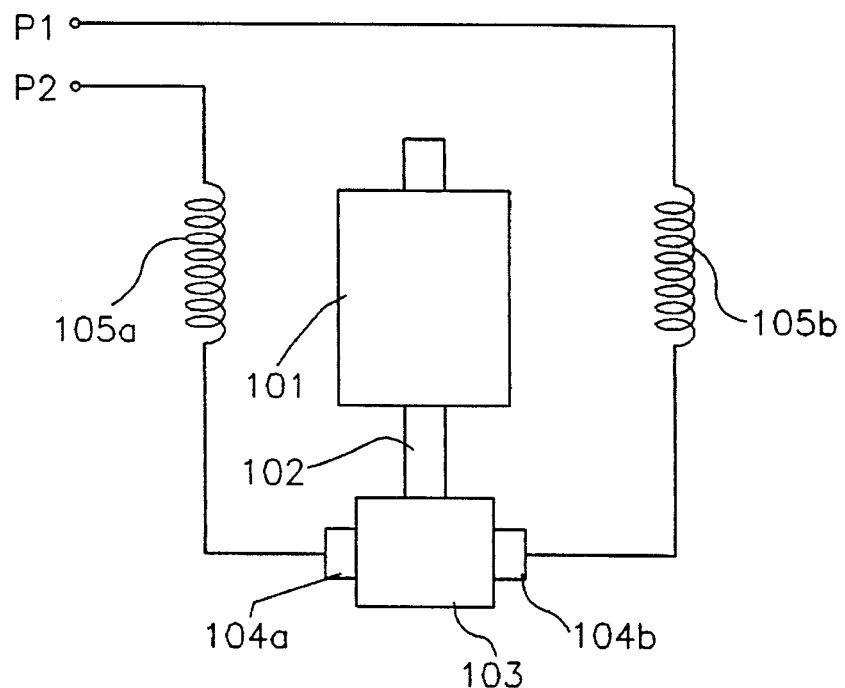
FIG. 1 shows a construction of a conventional universal motor.
Figure 2:
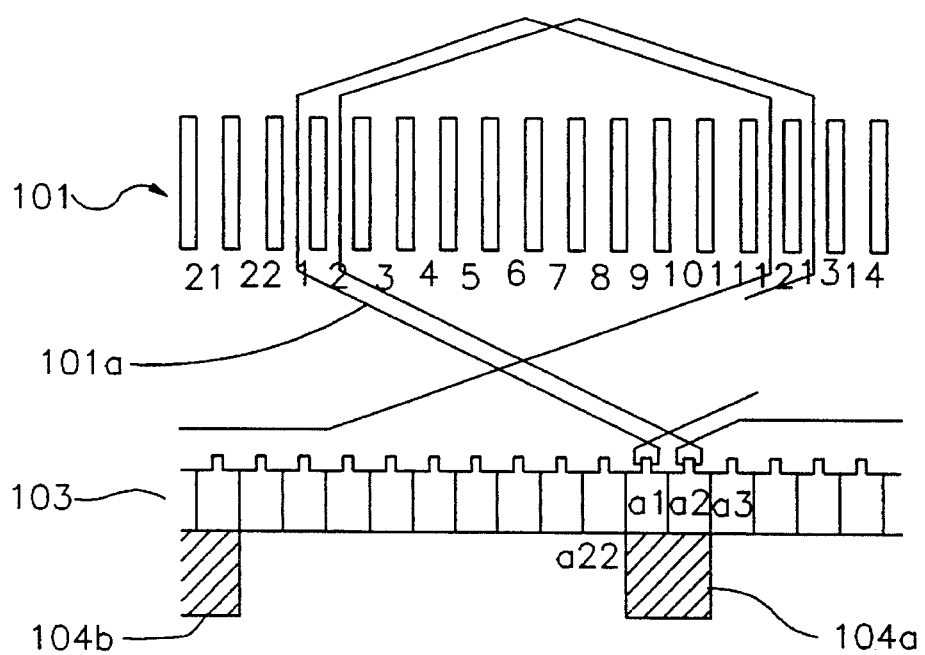
FIG. 2 is a winding diagram of the armature coil of the motor shown in FIG. 1.
Figure 3:
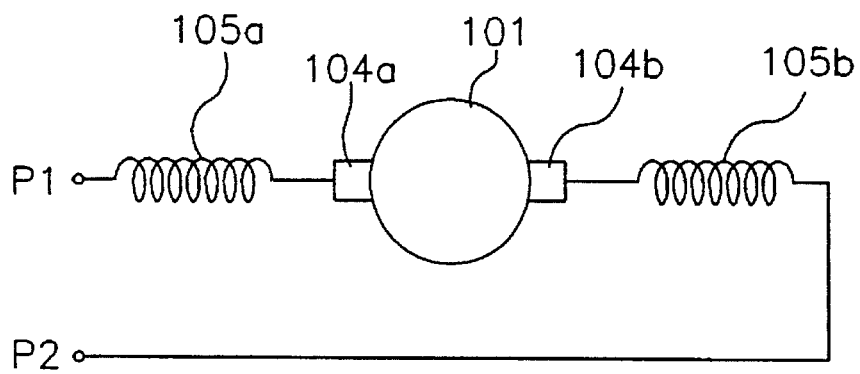
FIG. 3 is a schematic circuit diagram of the motor shown in FIG. 1.
Figure 4:
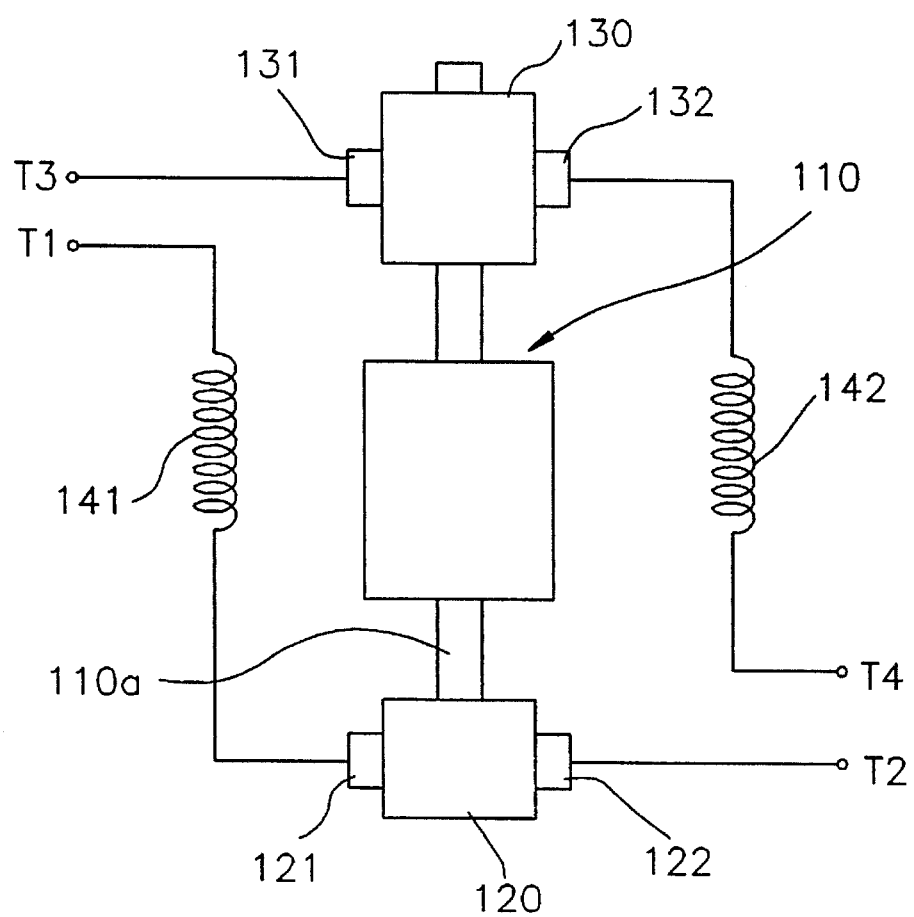
FIG. 4 shows schematically a construction of a motor capable of using various voltages according to the present invention.

FIG. 4 is a schematic diagram for illustrating a circuit of a motor operable at a high or low voltage according to one embodiment of the present invention. The motor includes an armature 110 having twenty-two slots formed on the surface portion thereof and armature 110 is provided in the motor housing (not shown). A rotation shaft 110a passes through the center of armature 110, a first commutator 120 and a second commutator 130 are provided at lower and upper portions of rotation shaft 110a on opposite sides of armature 110. Each first and second commutator 120 and 130 includes twenty-two commutator pieces corresponding to the above twenty-two slots. On both sides of first commutator 120, a first and a second brushes 121 and 122 are provided so as to be in contact with first commutator 120, and on both sides of second commutator 130, a third and a fourth brushes 131 and 132 are provided so as to be in contact with second commutator 130. In the meantime, the stators secured to the motor housing include two stator coil groups wound thereon. One end of a first stator coil 141 is connected to first brush 121 and the other end is connected to a first node T1. One end of a second stator coil 142 is connected to fourth brush 132 and the other end is connected to a fourth node T4. Additionally, second brush 122 is connected to a second node T2 and third brush 131 is connected to a third node T3.

Figure 5:
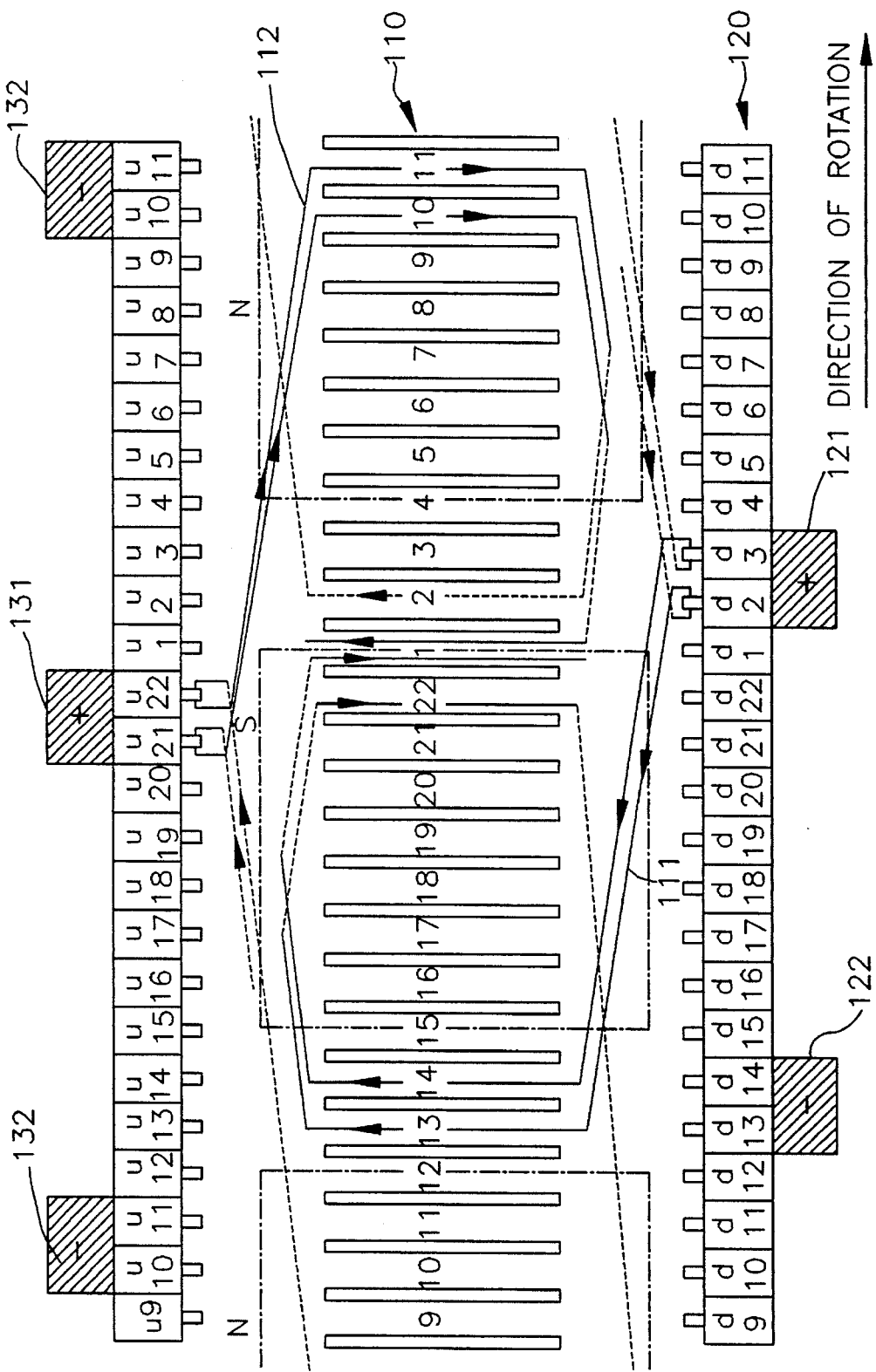
FIG. 5 is a winding diagram of the armature coil of the motor shown in FIG. 4.

In the meantime, as shown in FIG. 5, first and a second armature coils 111 and 112 is wound on armature 110 in the double winding back alpha type as mentioned above. First armature coil 111 is connected to the commutator pieces of first commutator 120 and second armature coil 112 is connected to the commutator pieces of second commutator 130. The turning number of the armature coils determines the rotation power of the armature, that is the motor power. No matter whether first commutator 120 and second commutator 130 are connected in series or in parallel, the sum of turning numbers of first armature coil 111 and second armature coil 112 per each slot is kept constant so that the rotating power of the armature is constant independently of connection type whether in series or in parallel.

Figure 6A:
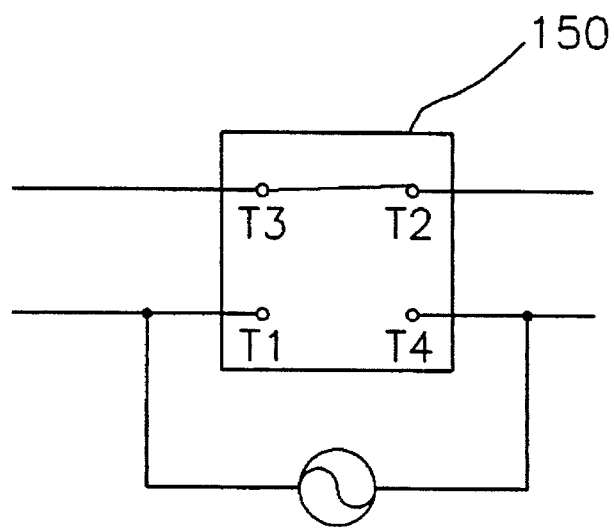
FIGS. 6A and 6B are a schematic circuit diagram and a view of connections among four terminals of the motor shown in FIG. 4, to which is applied a high voltage.
Figure 6B:
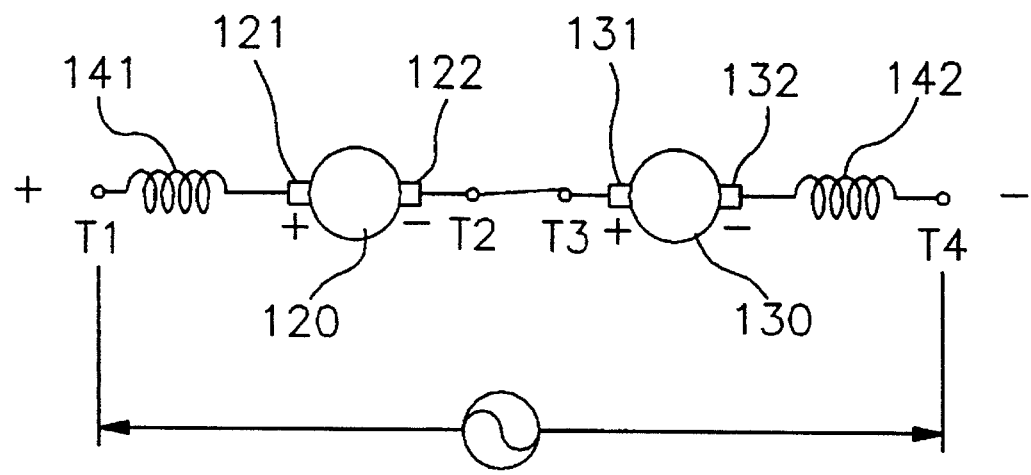
Figure 7A:
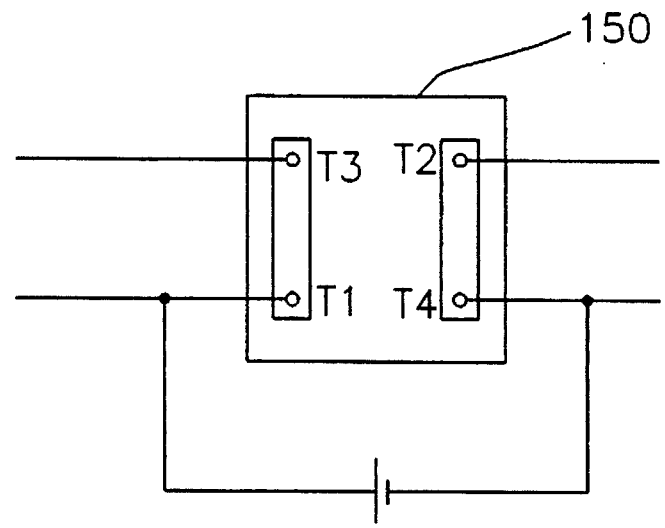
FIGS. 7A and 7B are a schematic circuit diagram and a view of connections among four terminals of the motor shown in FIG. 4, to which is applied a low voltage.
Figure 7B:
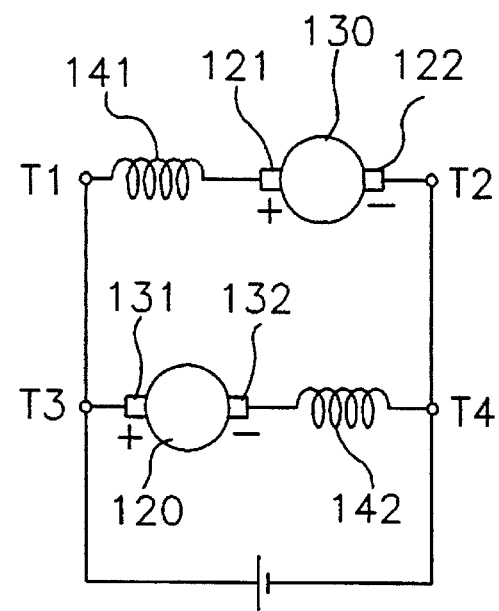

Additionally, the motor according to one embodiment of the present invention may include a switching part 150 as shown in FIGS. 6 and 7. When a high voltage is applied to the motor, switching part 150 connects second node T2 with third node T3 as shown in FIG. 6A so that first stator coil 141, first commutator 120 and first armature coil 111 connected in series are connected in series to second armature coil 112, second commutator 130 and second stator coil 142 connected in series, as shown in FIG. 6B. When a low voltage is applied to the motor, switching part 150 connects first node T1 with third node T3 and also connects second node T2 with fourth node T4 as shown in FIG. 7A so that first stator coil 141, first commutator 120 and first armature coil 111 connected in series are connected in parallel to second armature coil 112, second commutator 130 and second stator coil 142 connected in series, as shown in FIG. 7B.

In the meantime, the brushes are provided in such a manner that first and second brushes 121 and 122, which are connected to both sides of first commutator 120, precede third and fourth brushes 131 and 132, which are connect to both sides of second commutator 130, by a predetermined number of commutator pieces. For example, when both the numbers of the commutator pieces and armature slots are twenty-two as shown in FIG. 5, first and second brushes 121 and 122 may precede third and fourth brushes 131 and 132 by three commutator pieces.

FIGS. 8 to 11 show a cord reel installed at a cleaner including a motor of the present invention enclosing a battery.

Figure 8:
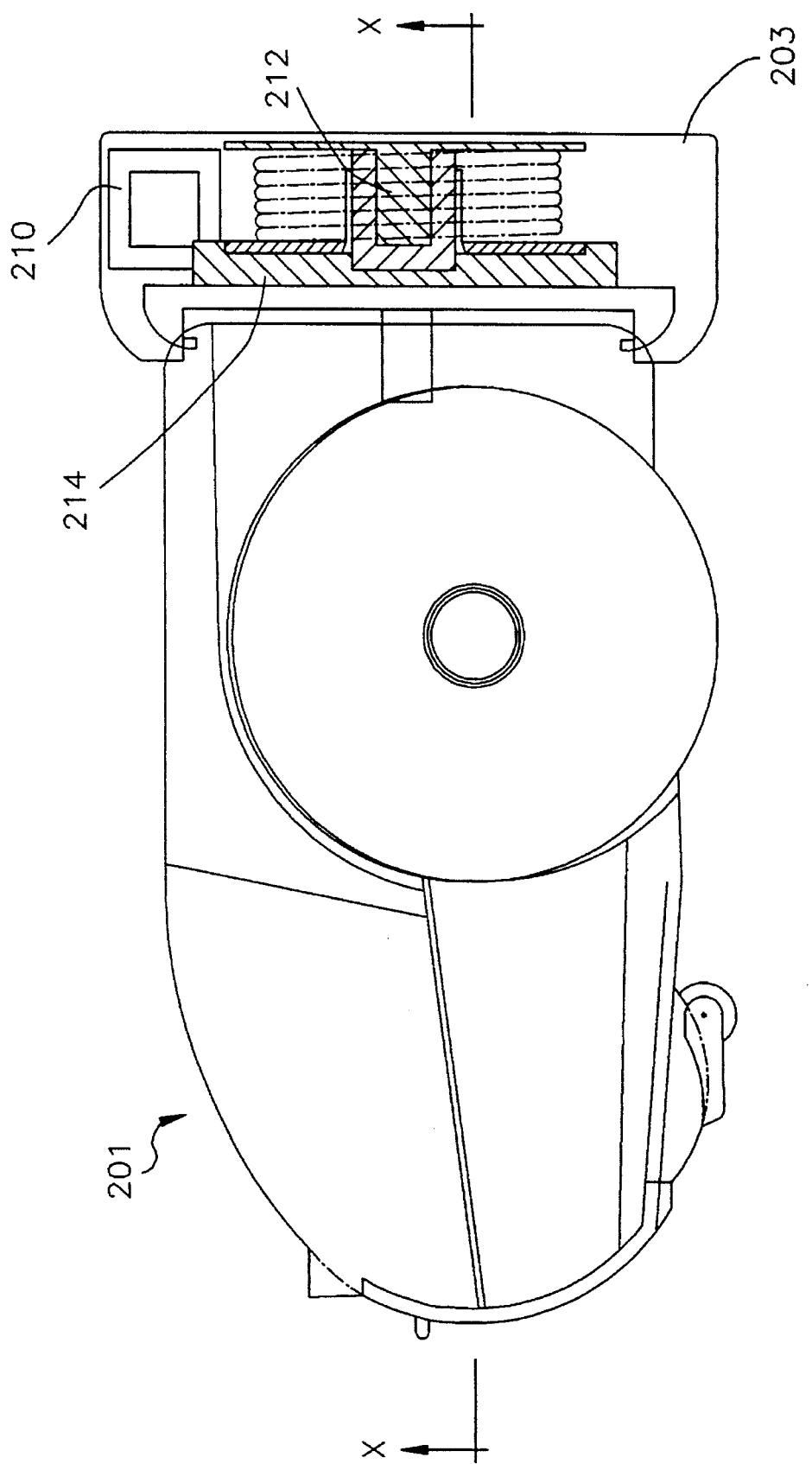
FIGS. 8 to 11 show a cleaner body enclosing a universal motor, and a battery, at which a cord reel section may be installed.
Figure 9:
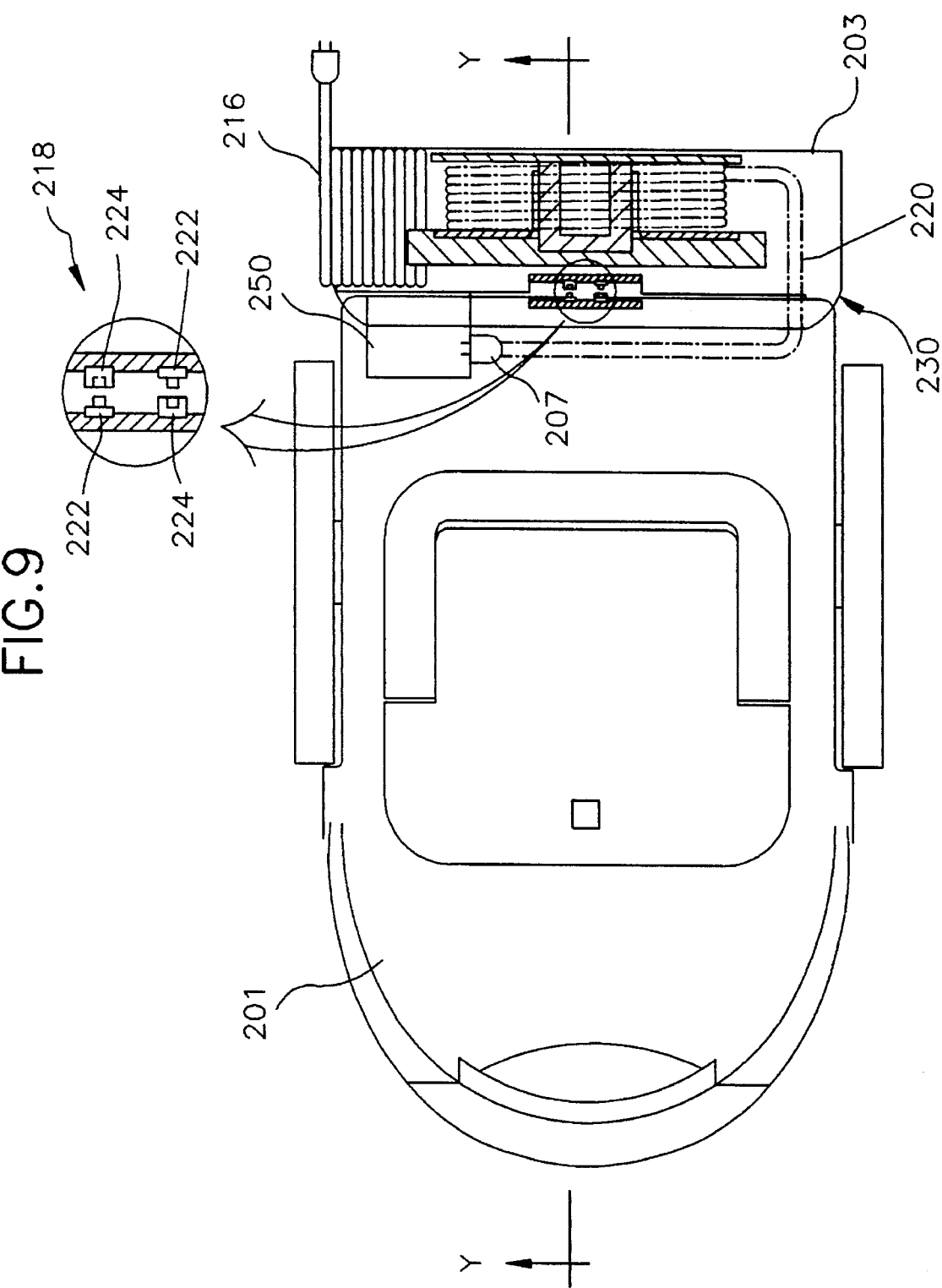

FIG. 8 and FIG. 9 show, respectively, a front view and a plan view inclusive of a partial cross-section view of the cleaner mounting the cord module.

As shown in FIG. 8 and FIG. 9, the cleaner has a transformation and charge circuit 210 on the upper part of a cord reel 212 and dc battery connection section 218 between the cleaner body 201 and the cord module 203. As indicated in the partially enlarged view in FIG. 9, the dc battery connection section 218 comprises two pairs of male and female terminals.

Figure 10:
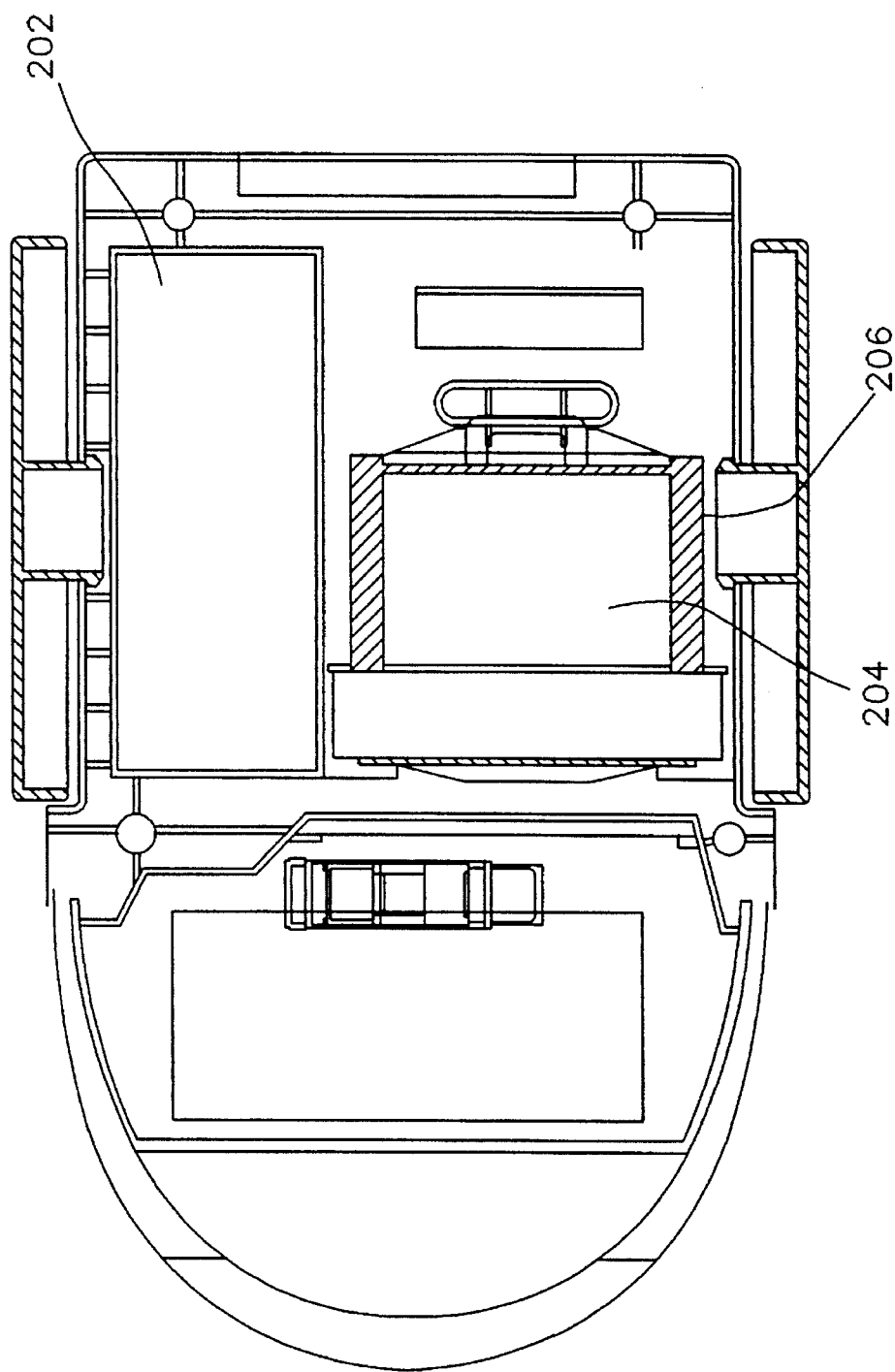
Figure 11:
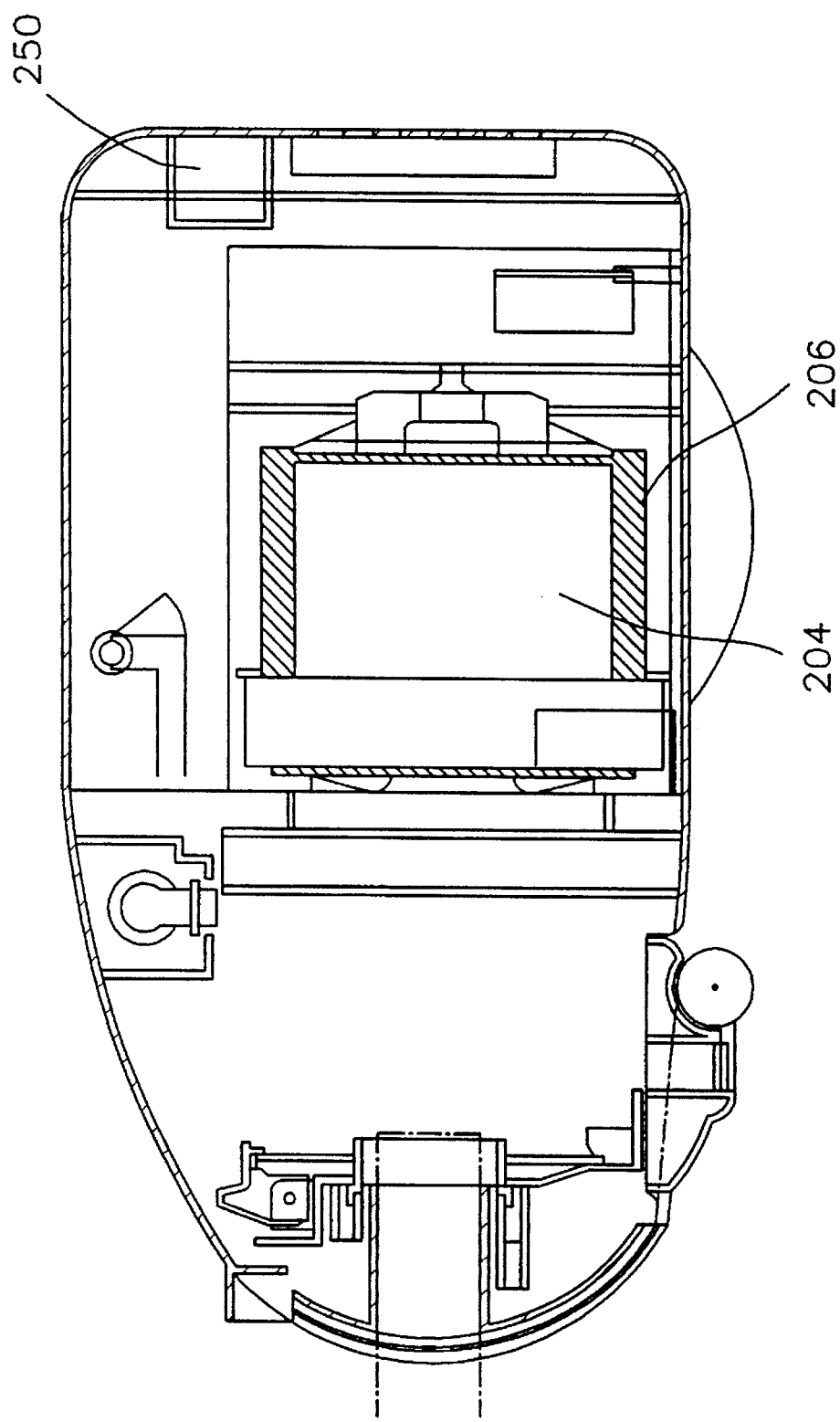

FIG. 10 and FIG. 11 depict cross-section views for the cleaner body which are cut along the X—X line and Y—Y line shown in FIG. 8 and FIG. 9, respectively.

As shown in FIG. 10 and FIG. 11, the vacuum cleaner is equipped with a universal motor 204 driven by a high or a low voltage electrical power according to the present invention and a dc battery 202 in the cleaner body 201.

And also, an automatic DC/AC switching section 250 is mounted at the rear of the cleaner body 201, which makes DC/AC switching automatically possible.

When using high voltage electrical power, the cord module 230 is mounted on the cleaner body 201 which electrically disables the dc battery terminals 218. At this time, by inserting a cord plug 207 extended from the module 230 into a switching section 250 of the cleaner 201, the switching section 250 is automatically switched in order for AC power to be supplied to the cleaner.

And automatic electric power switching in the cleaner is made with a connecting state for using a low dc voltage when dismounting the cord module after unplugging.

Several concrete configurations of a switching section embodiment according to embodiment of the present invention applied to the vacuum cleaner, will be described hereinafter in detail.

The following description will be made on an assumption that a low voltage source, such as a battery, is enclosed in a vacuum cleaner and a high voltage is supplied to the cleaner from an external electric power source through a power cord.

FIG. 12 to FIG. 20 are views showing a construction of a switching section as one embodiment according to the present invention.

Figure 12:
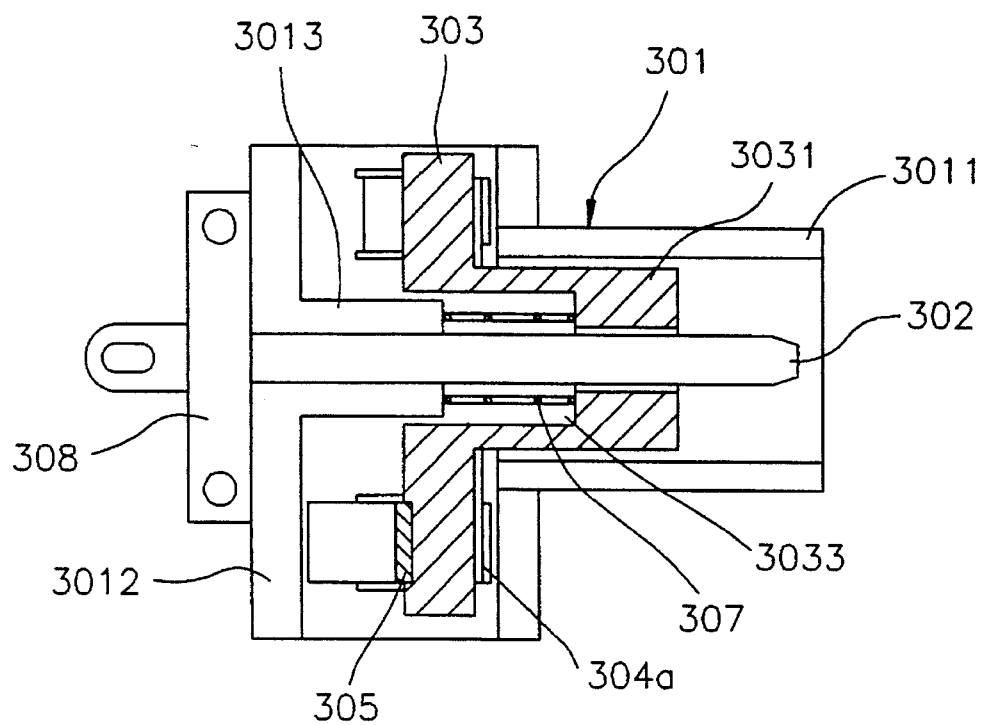
FIGS. 12 and 13 show cross sectional views of a switch section according to an embodiment of the present invention, respectively when a power of low and high voltage is applied thereto.
Figure 13:
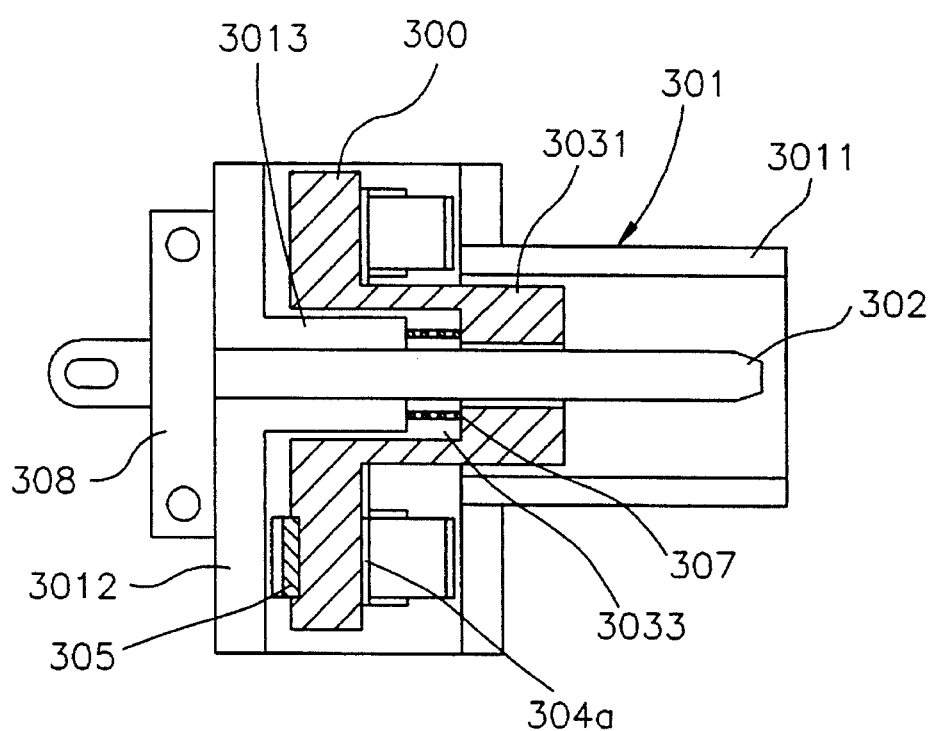

The switching section, as shown in FIG. 12 and FIG. 13, has a switch housing 301.

The switch housing 301 comprises a body section 3012 of the switch housing 301, a receiving section 3011 for receiving an external power cord plug and a guiding protrusion 3013 protruded from middle of the body section 3012. A switching member 303 is provided in the switch housing 301, and the switching member 303 has a forward protrusion 3031 and a base plate 3032 incorporated therewith.

Figure 15:
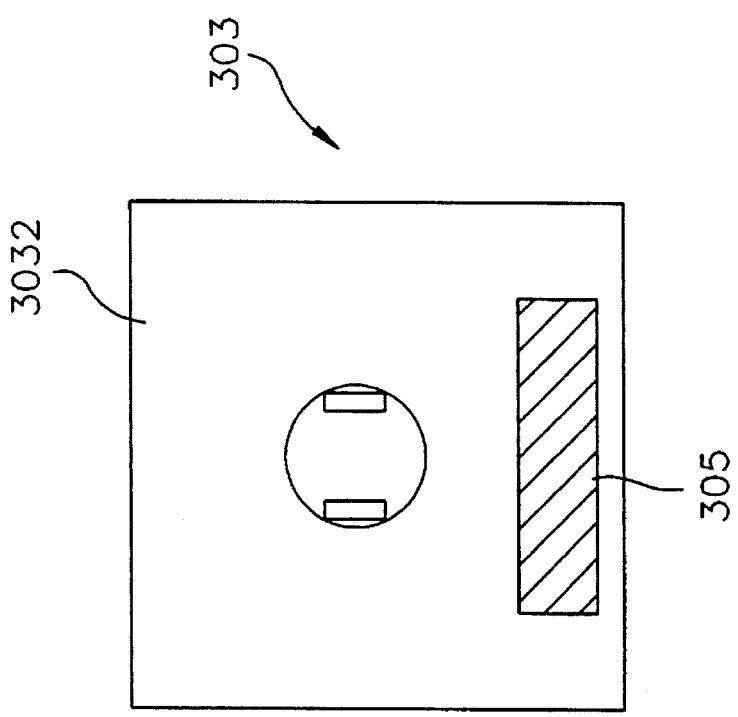
FIGS. 14 and 15 are respectively a front and a rear view of the base plate included in the switch section shown in FIGS. 12 and 13.
Figure 14:
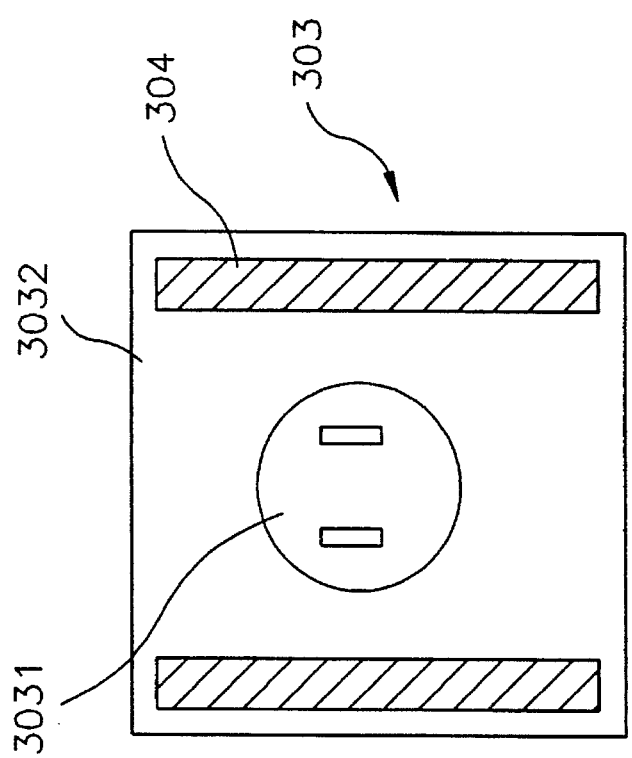

Vertically extending first and second conductors 304a, 304b are attached at both sides of the front surface of base plate 3032, as shown in FIG. 14 and FIG. 15, and a third conductor 305 is attached at the lower part of the rear surface the base plate 3032.

The forward protrusion 3031 is inserted into the receiving section 3011 movable in forward and rearward directions, a recess 3033 is formed inside the forward protrusion 3031 protruded from the middle of the base plate 3032, a guiding protrusion 3013 is inserted into the recess 3033.

A holder 308 is fixed on the rear surface of body section 3012 of the switch housing 301, and two plug terminals 302 fixed by the holder 308 extend from the rear of the holder 308 through the inside of the guiding protrusion 3013, the recess 3033 and the forward protrusion 3031 of the switching member 303, in order, into the receiving section 3011.

The plug terminals 302 are made of conducting material in a rectangular plate shape, having a power plug to be received into the receiving section 3011 and two slots 314 in order for the two plug terminals 302 to be inserted.

A spring 307 is installed between the guiding protrusion 3013 and the bottom of the recess 3033, so that a biasing force caused by the spring 307 is applied to the switching member 303 in a forward, i.e., rightward direction, as shown in FIG. 12.

Figure 20B:
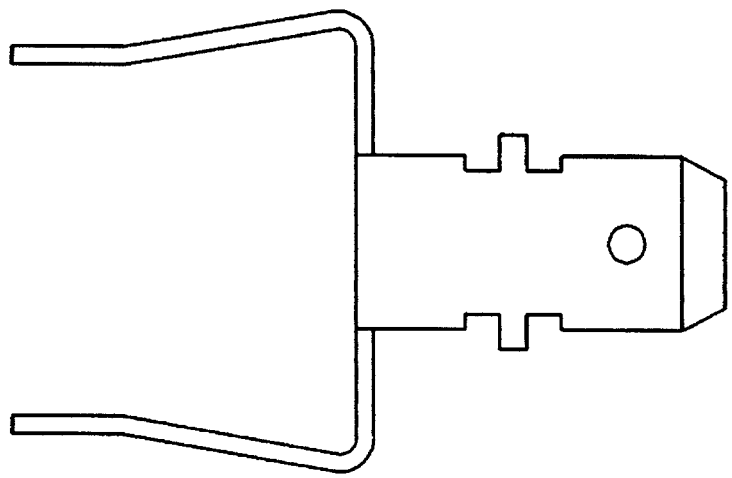
FIGS. 20A and B are side elevations of the terminals shown in FIG. 19.
Figure 20A:
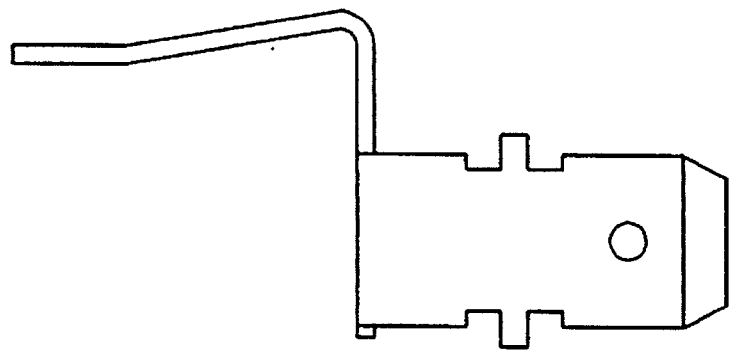

In the meantime, six terminals T1 to T6 are disposed at the right and left sides of the base plate 3032, and terminals T1, T4, T5, T6, respectively, as shown in FIG. 20A, in order to be in contact with the first and second conductors 304a, 304b when the base plate 3032 is in the front position thereof, whereas terminals T2, T3 respectively have both of front and rear contact plates, as shown in FIG. 20B, in order to be in contact with both of the first and second conductors 304a, 304b and the third conductor 305, respectively.

Meanwhile, the second and third terminals T2, T3 are connected to each other through their contact with the third conductor 305 when the switching member 303 is at the near position thereof, the first, third and sixth terminals T1, T3, T6 are interconnected to each other through their contacts with the third conductor 305, and the second, fourth and fifth terminals T2, T4, T5 are connected to each other through their contacts with the second conductor 304b when the switching member 303 is at the front position thereof.

The terminals T1, T2, T3, T4 are the same as those designated by the same reference numerals in FIGS. 4, 6, 7, 16 and 17.

Referring again to FIG. 4, the first terminal T1 is connected to the first stator coil group 141, the second terminal T2 is connected to the second brush 131, the third terminal T3 is connected to the third brush 131, and the fourth terminal T4 is connected to the second stator coil group 142.

In the meantime, the fifth and sixth terminals T5, T6 are respectively connected to the battery built in the cleaner, the first and fourth terminal T1, T4 are respectively connected to the plug terminals 302 penetrating the switch housing 301.

The switch according to the present embodiment mentioned above performs its switching operation as below.

That is, in a state that a power cord plug 340 is not plugged as shown in FIG. 12, the switching member 303 is pushed forward to its front position by a biasing force of the spring 307.

Figure 16:
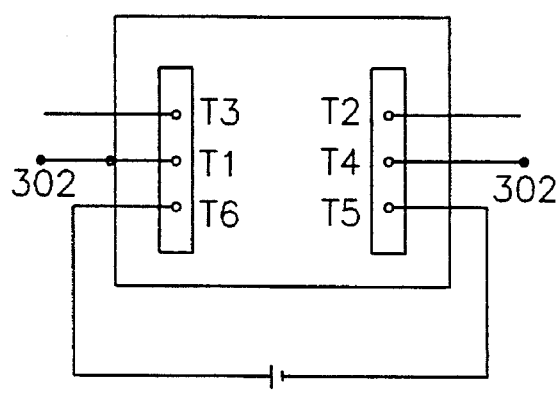
FIGS. 16 and 17 show the connections of the switch section shown in FIG. 12, respectively when a power of low and high voltage is applied thereto.

Therefore, the terminals T1, T3, T6 are interconnected through the first conductor 304a and the terminals T2, T4, T5 are also interconnected through the second conductor 304b, as shown in FIG. 16. In this case, a direct current power of low voltage is supplied to the motor and at the same time, a parallel connection is made between a first circuit comprising the stator coil group 141, the first commutator 120, and the first armature coil 111 connected in series and a second circuit comprising the second armature coil 112, the second commutator 130 and the second stator coil group 142 connected in series.

Figure 18:
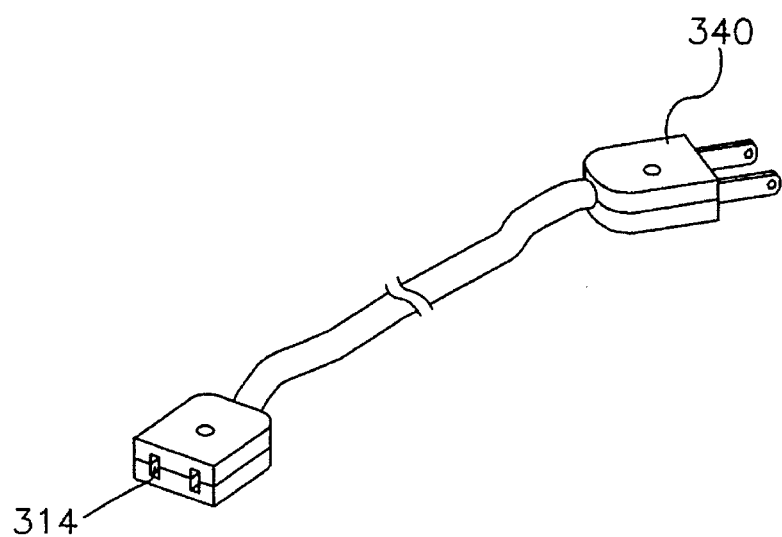
FIG. 18 is a schematic perspective view of a cord to be connected to plug terminals of the switch section shown in FIG. 14 to supply electric power thereto.
Figure 19:
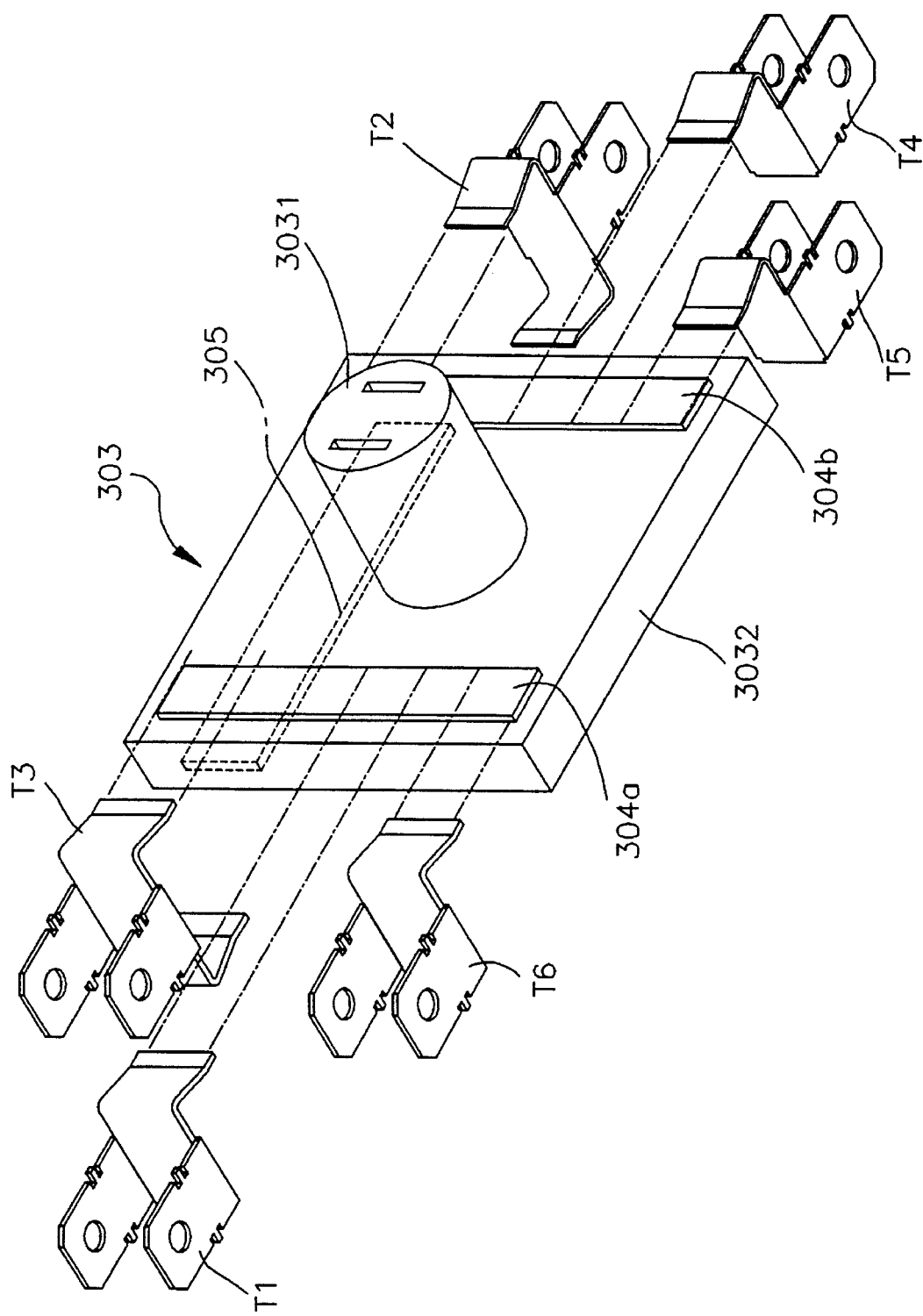
FIG. 19 is an exploded perspective view of a switching member and terminals in the switching section shown in FIG. 12.

When a power cord plug as shown in FIG. 18 is plugged, the switching member 303 is urged rearward by the plug to be positioned in its rear position as shown in FIG. 13, the plug terminals 302 are plugged in the plug slots 314 of the power cord plug 340 so that alternating current power of high voltage can be supplied, and, the terminals T2, T3 are connected to each other by the third conductor 305 mounted on the rear surface of the switching member 303.

Figure 17:
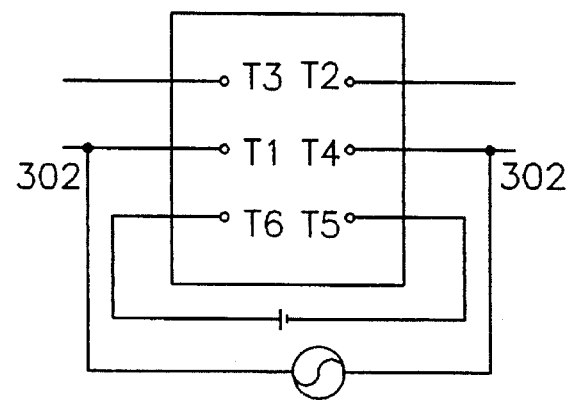

Accordingly, the terminals T1, T3, T6, T2, T4, and T5 are interconnected as shown in FIG. 17, and thereby an alternating current power of high voltage can be supplied, and at the same time, the first circuit is connected in series with the second circuit.

Figure 21:
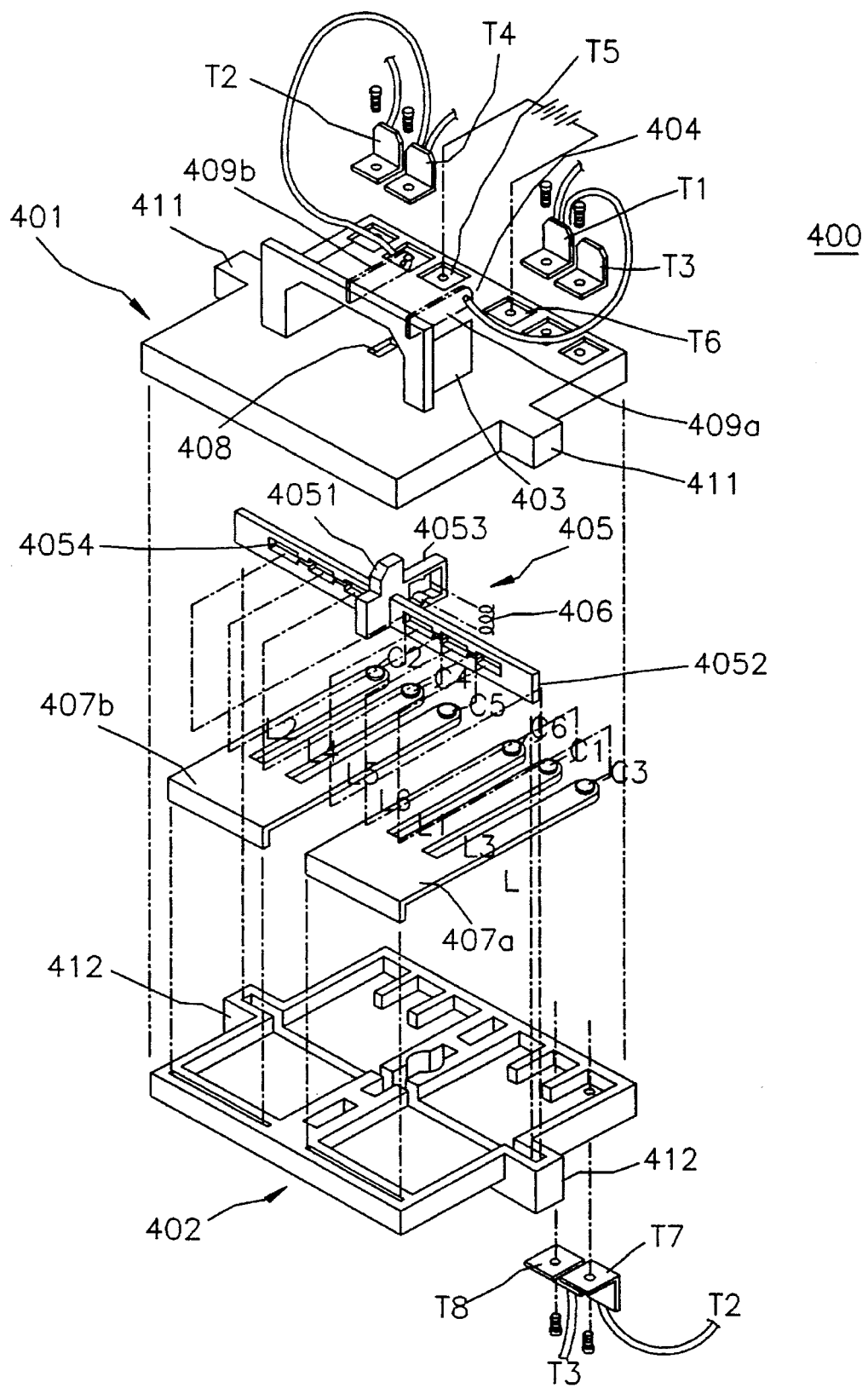
FIG. 21 is an exploded perspective view of the switching section according to another embodiment of the present invention.

FIG. 21 shows a direct/alternating current switching section 400 of a motor capable of using high or low voltages according to another embodiment of the present invention.

The switching section 400 comprises an upper case 401 and lower case 402, which form a switch housing. The outside of upper case 401 is provided with a plug receiving section 403 to which two connector pins 409a, 409b are fixed in order to be inserted into slots of the plug and thereby to be electrically connected with the external alternating voltage power source. The center of the upper case 401 under the plug receiving section 403 is provided with a hole 408. Three terminals T1, T3, T6 and three terminals T2, T4, T5 are provided at rear of plug receiving section 403, wherein first connector pin 409a is connected to a terminal T1 and second connector pin 409b to a terminal T4. The lower case comprises terminals T7, T8 in which terminal T7 is electrically connected to terminal T2, and terminal T8 to terminal T3.

There are provided a switching member 405 and first and second conductors 407a, 407b in the housing 400. The switching member 405 comprises a transverse beam section 4052 of a standing rectangle plate, an upper protrusion 4051 projecting upwards from the center of the section 4052, and a snap section 4053 projecting rearward from the center of the section 4052. The transverse beam section 4052 has six openings 4054, every three of which are formed at each side thereof, the snap section 4053 is provided with a spring 406 therein, and the front upper edge of the protrusion 4051 has an inclined surface.

Guiding grooves 411, 412 are formed inside the upper case 401 and lower case 402, respectively, and the guiding grooves 411 and 412 are combined to form new guiding grooves in either side of the switch housing, in which is inserted the transverse beam section 4052 freely to move upward or downward therein.

The first and second conductors 407a, 407b of conductive material respectively comprise an integrally formed front part and a rear part consisting of three legs separated from each other, therefore each conductor serves to electrically connect the terminals, in contact with the legs, with each other. The rear part of first conductor 407a comprises legs L1, L3, L6, the rear part of second conductor 407b comprises legs L2, L4, L5, each leg respectively extending through in each opening 4054, and ending parts C1, C2, C3, C4, C5, C6 of these legs extend to and contact with the terminals T1, T2 . . . T8.

The switching section 400 referred above peforms a switching operation as follows.

When an external plug 340 is not inserted in plug receiving section 403, the switching member 405 is urged upward by spring 406, the upper protrusion 4051 protrudes out of the upper case 401 through the hole 408, and thereby the ending parts C1, C3, C6 of legs L1, L3, L6 in first conductor 407a contact with terminals T1, T3, T6 and the ending parts C2, C4, C5 of the legs L2, L4, L5 in second conductor 407b connect with T2, T4, T5.

Figure 22:
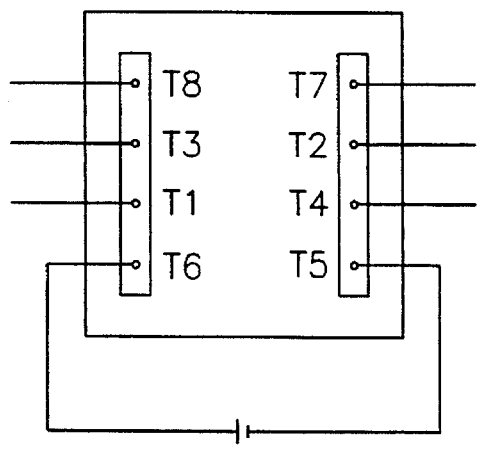
FIGS. 22 and 23 show connections among terminals in the switching section shown in FIG. 21 respectively when a power of low and high voltage is applied thereto.

Therefore, the terminals of the switching section 400 are connected with each other as shown in FIG. 22, so that the first circuit comprising first stator coil group 141, first commutator 120 and first armature coil 111 connected in series and is connected in parallel with the second circuit comprising second armature coil 112, second commutator 130, and second stator coil group 142 also connected in series as shown in FIG. 6A.

Figure 23:
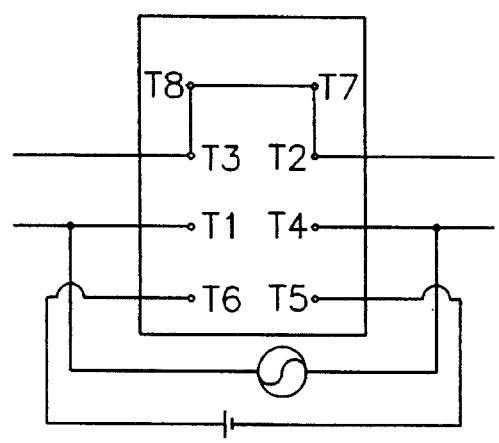
Figure 25:
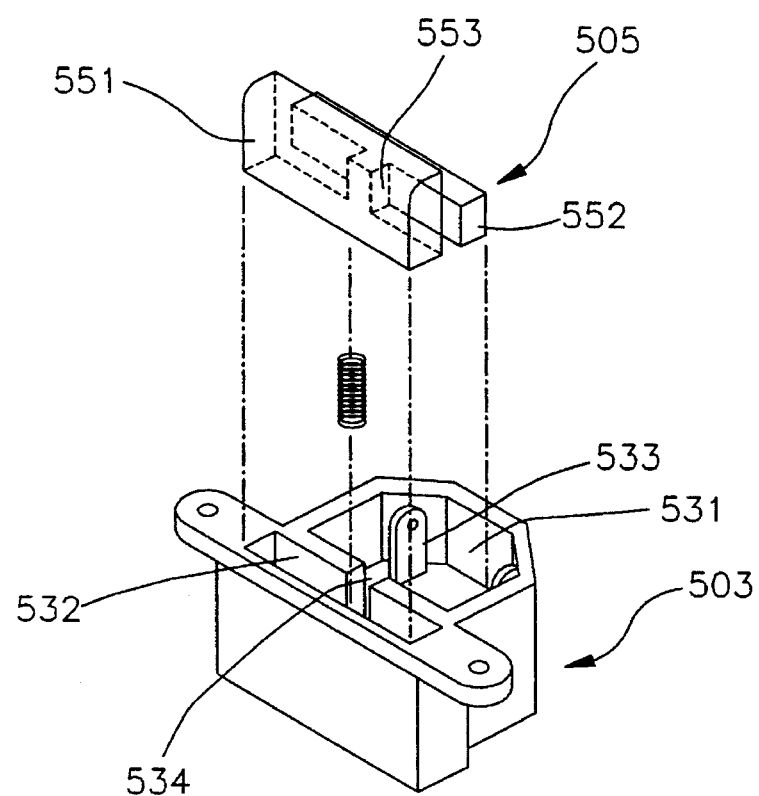
FIG. 25 is an enlarged view of a plug receiving member and a stopper to be disposed therein.

When a plug 340 as shown in FIG. 18 is inserted into the plug receiving section 403, the plug body comes into contact with the inclined surface of the protrusion 4051 and to press protrusion 4051 downward, therefore the legs L1 to L6 of first and second conductors 407a, 407b which extend through openings 4054 of the switching member 405 shift to their lower positions, so that the ending parts C1 to C6 of the legs L1 to L6 are separated from the terminals, and instead the ending parts C1, C3 come to be in contact with the terminals T7, T8. In this case, the terminals in the switching section are connected with each other as shown in FIG. 23, so that the first circuit and the second circuit are connected in series with each other, as shown in FIG. 6B. When the plug is extracted from the plug receiving section, switching member 405 is moved upward by the spring 406, which is installed in a snap section 4053.

Figure 24:
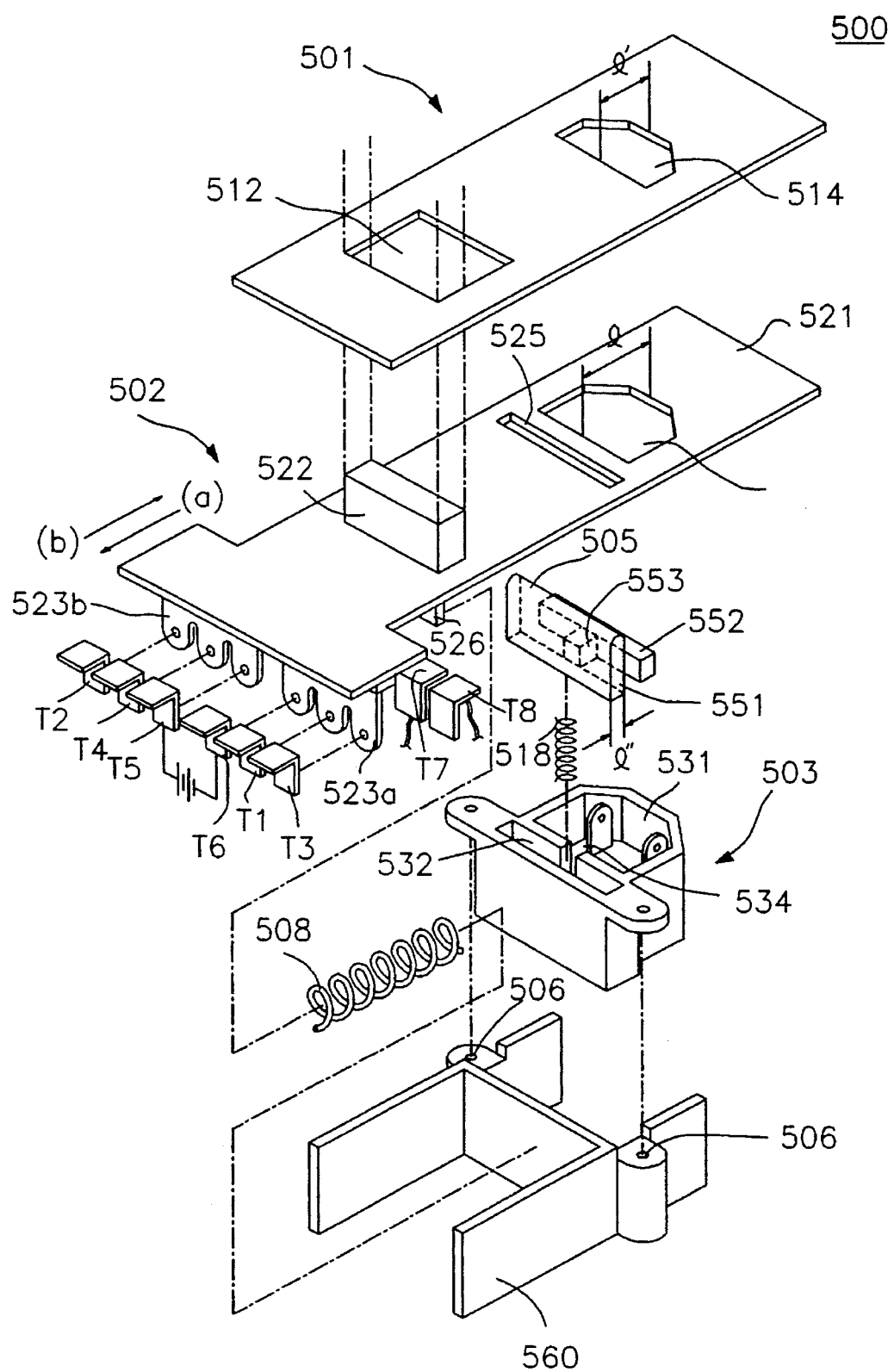
FIG. 24 is an exploded perspective view of the switching section according to another embodiment of the present invention.

FIG. 24 shows an exploded view of a switching section 500 according to another embodiment of this invention.

The switching section 500 comprises an outer plate 501 having a knob opening 512 and first plug opening 514.

A switching member 502 is provided at the inside of outer plate 501. At the upper surface of the switching plate 521 is disposed a knob 522 inserted in knob opening 512. A second plug opening 524 formed on the switching plate 521 corresponds to first plug opening 514 of the outer plate 501 and plug opening 524 is greater in longitudinal width 1 than first plug opening 514 longitudinal width 1'. Between second plug opening 524 and knob 522, stopper opening 525 is formed which is adjacent to second plug opening 524 and is greater in width than second opening 524. On the bottom of the front part of the switching plate 521, vertically extending first and second conductor plates 523a, 523b are fixed, each of the upper parts of first and second conductor plates 523a, 523b being integrally formed as a plate of conductive materials, and each of the lower parts thereof comprising three legs separated from each other. Further, the terminals T1, T3, T6 are provided at the front of the first conductor plate 523a, the terminals T7, T8 at the rear thereof, and terminals T2, T4, T5 at the front of the second conductor plate 523b. As in the preceding embodiments, the terminals T1, T3, and T4 are connected to first stator coil group 141, second brush 122, third brush 131, and second stator coil group 142, respectively, fifth and sixth terminals T5, T6 are connected to both electrodes of direct power source and seventh and eighth terminals T7, T8 connect to second and third terminals T2, T3, respectively.

Under switching plate 521 is provided a plug member 503 which is in alignment with the first plug opening 514 and has plug receiving recess 531 and a stopper receiving recess 532 adjacent to that recess 531. The plug receiving recess 531 communicates with the stopper receiving recess 532, in which two connector pins 533 respectively connected to terminals T1, T4 are fixed through a connection slot 534.

The stopper 505 comprises an actuator section 551 having wider transverse with than that of the plug opening 524, an abutment section 552 of horizontally extending beam, and a connection section 553 connecting these members with each other.

The actuator 551 is inserted in the stopper receiving recess 532, the abutment section 522 in plug receiving recess 531, and the connection section 553 in the slot 534. A stopper 518 is disposed between a bottom surface of the stopper receiving recess 532 and actuator 551 to urge the stopper 505 upward.

A spring supporting plate 526 is provided on the lower surface of switching plate 521 between the plug receiving member 503 and conductor plates 523a, 523b, and a spring 508 is provided between the spring supporting plate 526 and the plug receiving member 503. The plug receiving member 503 is fixed to a supporting frame 560, thereby to press switching member 502 forward.

The switch section 500 having the above construction is operated as follows:

First, when an external alternating current power is not supplied into the motor through an external cord plug received in plug receiving recess 531, switching plate 521 is positioned at its front position, so that terminals T1, T3, T6 are interconnected with each other through first conductor plate 523a and terminals T2, T4, T5 through second conductor plate 523b.

Therefore, the terminals in switching section 500 are interconnected with each other as shown in FIG. 22, and the first circuit comprising first stator coil group 141, first commutator 120, and first armature coil 111 connected in series, is connected in parallel with the second circuit comprising second armature coil 112, second commutator 130, and second stator coil group 142 connected in series.

Meanwhile, when the stopper opening 525 is positioned on the stopper receiving recess 532 by pushing the knob 522, which protrudes outward through knob opening 512, rearward to supply external alternating current electrical power to the motor. The upward biasing force produced by the stopper spring 518 make the stopper 505 shift upward to be engaged in the stopper receiving recess 532. As a result switching member 502 stops at that position, and the plug opening 524 of switching plate 521 is positioned under the plug opening 514 of the outer plate 501 and upon the plug receiving recess 531. Next, inserting power plug into plug receiving recess 531 to connect the connector pin 533 through plug openings 514, 524 causes plug body to push the abutment section 552 in downward direction, thereby to extract the stopper 505 from stopper opening 525. In this case, because longitudinal width 1 of second plug opening 524 is greater than its width 1' of first plug opening 514, the switching plate 521 shifts forward until the inner periphery of second plug plug opening 524 meets to the plug body inserted in connection pin 533.

As a result, first and second conductor plates 523a, 523b are separated from terminals T1, T2 . . . T6, respectively, and terminals T7, T8 contact with first conductor plates 523a, respectively. Therefore, the terminals in switching section 500 are connected with each other as shown in FIG. 23, and the first circuit is connected in series with the second circuit.

Description of various constructions of the switching sections and the switching operation thereof was hereinabove made in accordance with the embodiments of the present invention wherein the battery is installed in the cleaner body of the vacuum cleaner, and the cordmodule is incorporated in the cleaner or the cord is connected with the cleaner when AC power source is supplied to the cleaner.

Hereinafter, detailed description will be given of a vacuum cleaner and a switching section which are operable with both high voltage and low voltage by detachably mounting a battery which is a power source of low voltage with reference to FIGS. 26 to 32.

Figure 26:
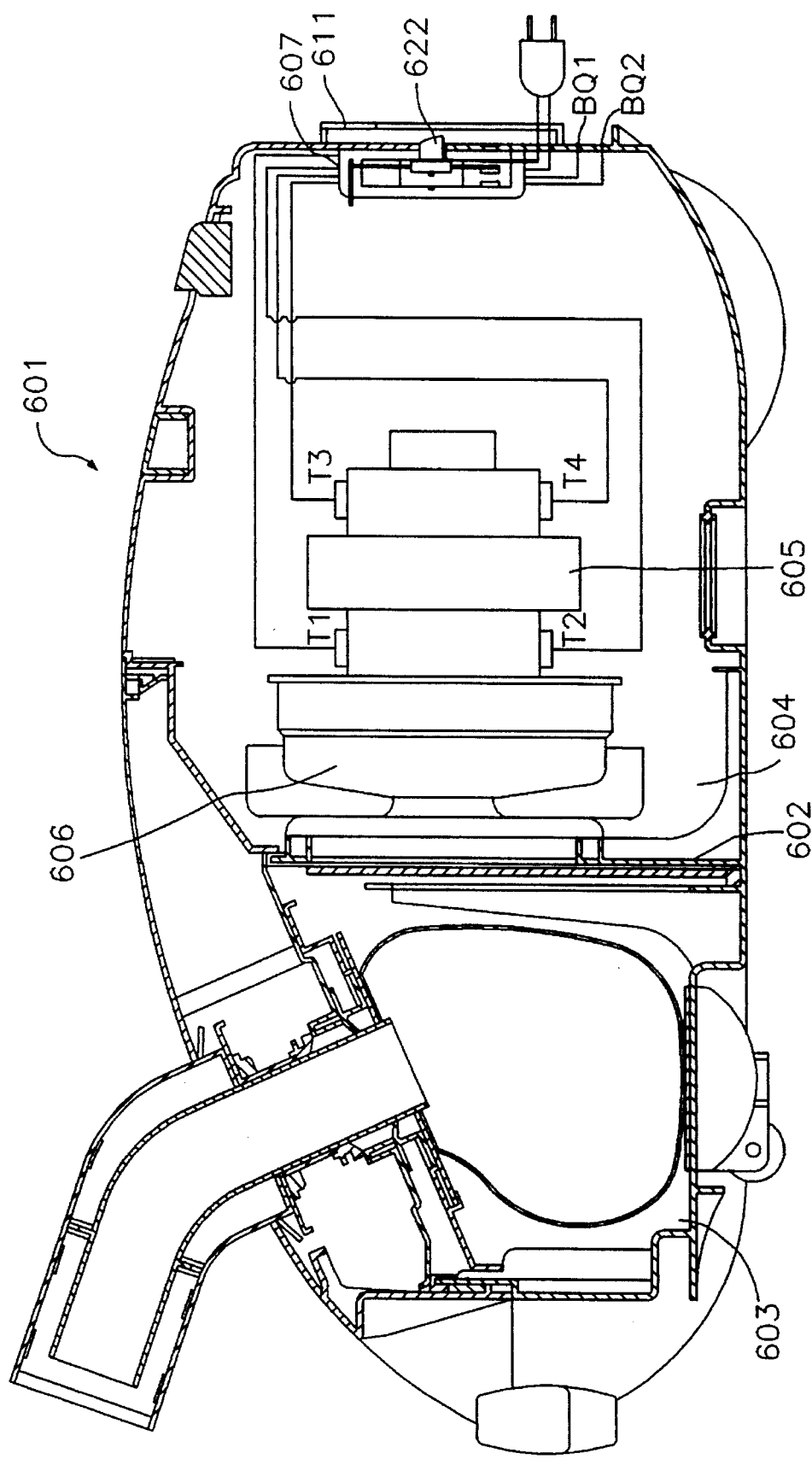
FIG. 26 is a sectional view of a cleaner body at which a battery is installed, according to another embodiment of the present invention.

FIG. 26 is a schematic longitudinal section showing a vacuum cleaner body 601 equipped with a motor according to another embodiment of the present invention, to which motor AC or DC, and accordingly high voltage power source or low voltage power source can be applied by detachably mounting a battery to the vacuum cleaner.

In FIG. 26, reference numerals 602 to 607 designate a partition wall, a dirt chamber, an electromotive blower chamber, a universal motor, an electromotive blower and a switching section, respectively. As shown in FIGS. 27 and 28, the switching section 607 is provided with an inner case 625, an outer case 623 and a switching member 621 incorporated therebetween. The inner case 625 is provided with a first to a fourth inner terminals Q1 to Q4, each of which is made of metal conductive plate. The outer case 623 is disposed at the rear surface of body housing of the cleaner and is provided at the positions corresponding to the first to fourth inner terminals Q1 to Q4 with a first to a fourth outer terminals 01, 02, 03, 04 and at the central part thereof with a protrusion opening 628.

A switching member 621 is provided between the corresponding inner terminals and outer terminals with a first to a fourth terminals T1 to T4 which are separate with each other and at the central part thereof with a base plate 626 which maintains the gaps between adjacent terminals T1 to T4. The base plate 626 is formed with a protrusion 622 passing through a protrusion opening 628 and projecting outwardly therefrom.

Figure 29:
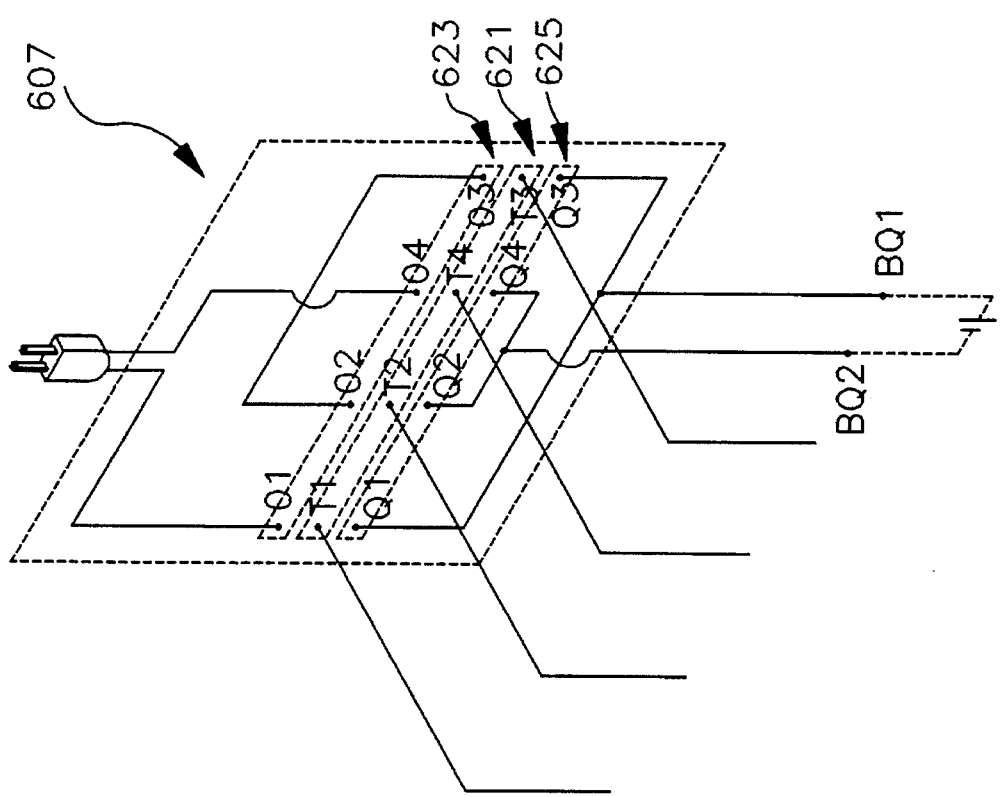
FIG. 29 shows connections among terminals in the switching section shown in FIG. 26.

Referring to FIG. 29 wherein circuit construction between respective terminals incorporated in the switching section 607 having such structure mentioned above is depicted schematically, and as shown, the second outer terminal 02 and the third outer terminal 03 in the outer case 623 are electrically interconnected with each other. The first outer terminal 01 and the fourth outer terminal 04 are connected with both terminals of AC power plug and thus may be connected to outer AC power source.

The first inner terminal Q1 and the third inner terminal Q3 in the inner case 625 are interconnected with each other and then are connected to a first DC power terminal BQ1, while the second inner terminal Q2 and the fourth inner terminal Q4 are interconnected with each other and then are connected to a second DC power terminal BQ2.

Further, the first to fourth terminals T1 to T4 of the switching member 621 are connected to the first stator coil group 141, the second brush 122, the third brush 131 and the second stator coil group 142, respectively, in the same manner as shown in FIGS. 6 and 7.

Figure 31:
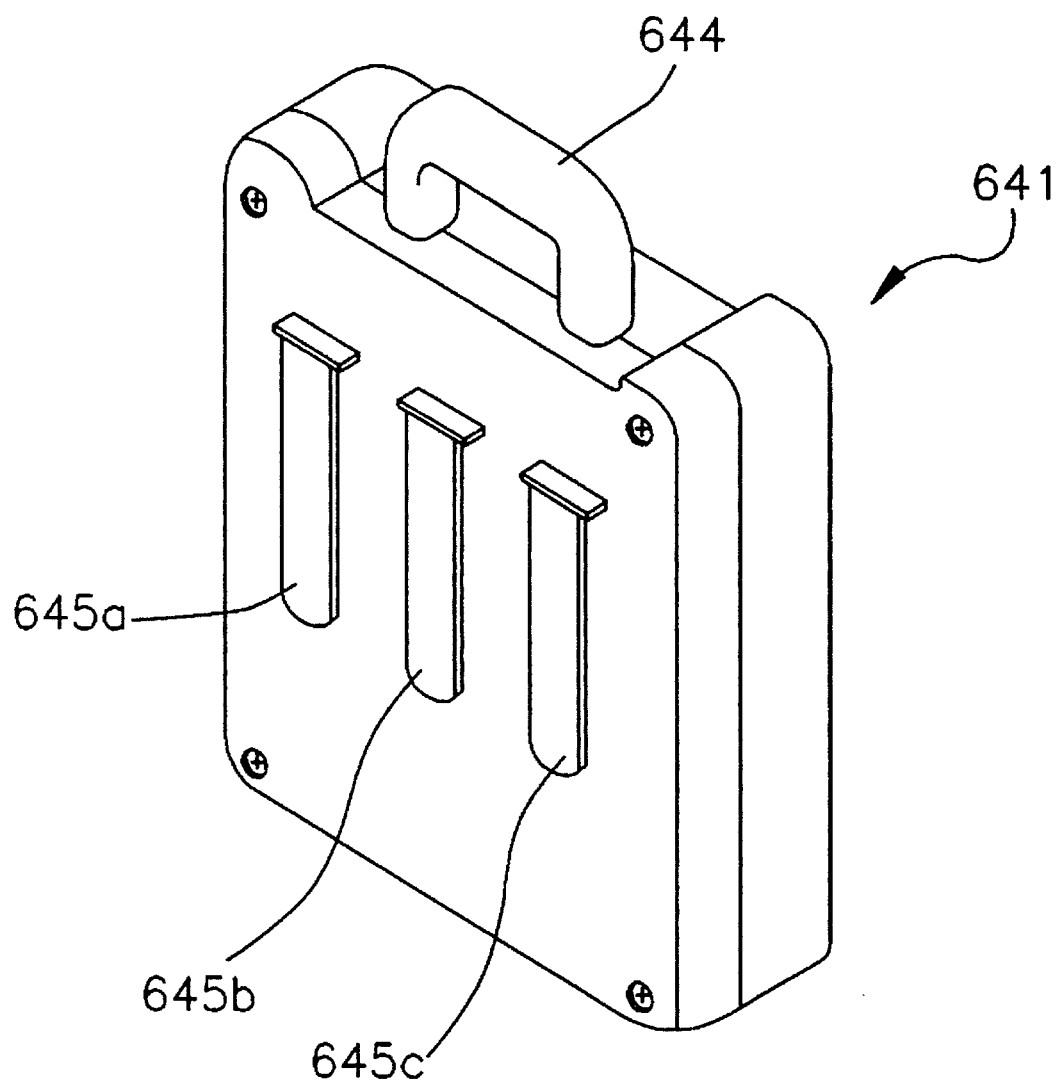
FIG. 31 is a perspective view of a battery to be installed on a body of a cleaner, according to the embodiment shown in FIG. 26.

Meanwhile, a battery 641 detachably mounted on the rear surface of the cleaner body 601 is, as shown in FIG. 31, provided on its top with a grip 644 and on its front surface with a first to a third suspension members 645a, 645b, 645c.

Figure 32A:
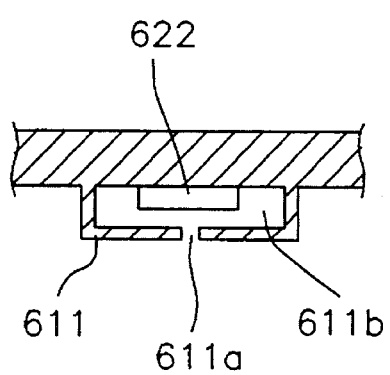
FIGS. 32A and 32B are enlarged views of a rail of the cleaner body and suspension members of a battery in the embodiment shown in FIG. 26.
Figure 32B:
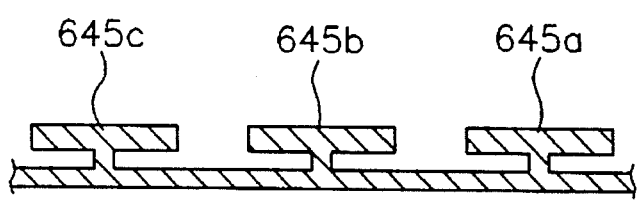
Figure 33:
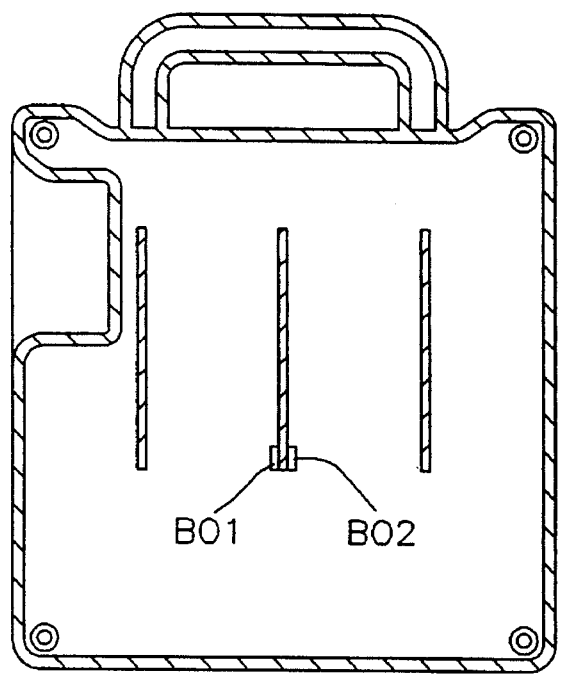
FIG. 33 is a front cross sectional view of the battery shown in FIG. 31 from which the suspension members are excluded.

A first battery terminal B01 and a second battery terminal B02 are formed on the front surface of the battery 641 corresponding to the inner lower part of the second suspension member 645b, both of which terminals constitute a pair of electrodes of the battery 641 and contact with the first DC power terminal BQ1 and the second DC power terminal BQ2 when the battery is mounted. As shown in FIG. 32(B), the first to third suspension members 645a to 645c are in the shape of T and are made of insulating materials. Three rails 611 for carrying the battery are provided on the rear surface of the cleaner body, and since the rails 611 have an open space 611b therein by means of a central slit 611a, as shown in FIG. 32A, the first to third suspension members 645a to 645c are fitted in the corresponding slit 611a when mounting the battery.

Figure 30:
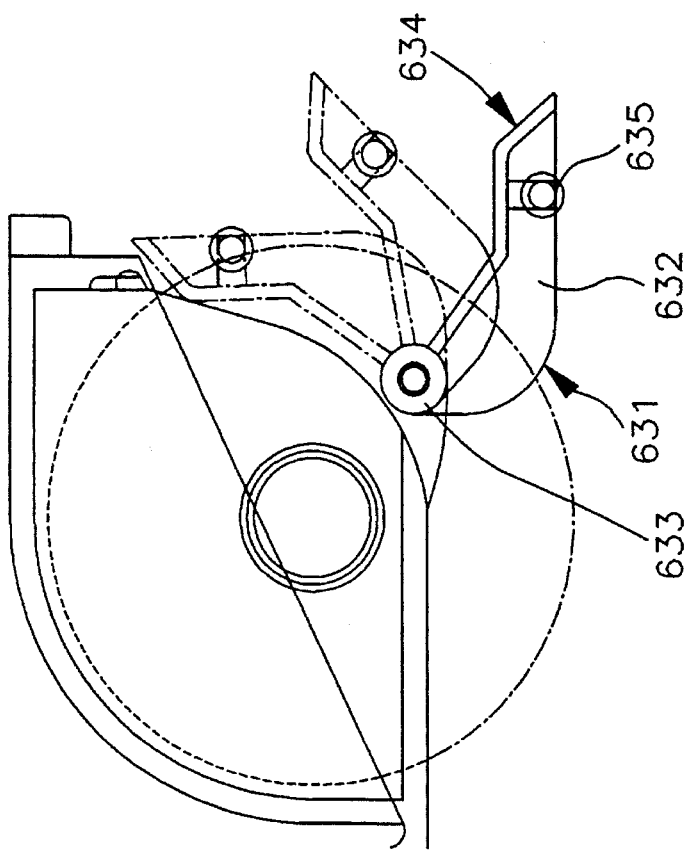
FIG. 30 is a schematic view of a battery support member disposed at a lower rear part of a body of a cleaner, according to the embodiment shown in FIG. 26.

A support member 631 for supporting the heavy-weighted battery 641 is mounted on the lower part of the rear surface of the cleaner body 601, and as shown in FIG. 30, a body 632 of the support member 631 is so formed as L-shaped plate as to mount the battery 641 thereon. The body 632 is hinged by a pivot pin 633 at the one end thereof, and is provided with an inclined surface 634 formed at the other end thereof. A support wheel 635 is provided at the lower part of the end having the inclined surface 634. The pivot pin 633 is provided with a plate spring, though not shown.

The mounting of the battery to the cleaner and the connection-state in the switching section 607 raised by the completion of the mounting will hereunder be described according to the present embodiment.

First, in the state that the battery 641 is not installed to the cleaner, the switching section 607 is in the state as shown in FIG. 27(B), and thus the first to fourth terminals TI to T4 are connected to the first to fourth terminals 01 to 04, respectively.

When the plug is connected to AC power source, the first circuit consisting of the stator coil group 141, the first commutator 120 and the first armature coil 111 in series and the second circuit consisting of the second armature coil 112, the second commutator 130 and the second stator coil group 142 in series as shown in FIG. 6 are also connected with each other in series and thus AC power source can be supplied thereto.

On the other hand, when the first to third suspension members 645a, 645b, 645c of the battery 641 are engaged with the three rails 611 and mounted downwardly, the protrusion 622 is pressed and retreats inward the switching section 607 due to the descent of the second suspension member 645b, and the battery 641 slides along the inclined surface 634 of the support member 631 with pivoting the support member 631 by 90 degrees, and then is mounted thereon, and the support wheel 635 reaches the floor to allow the vacuum cleaner to move freely.

Figure 34:
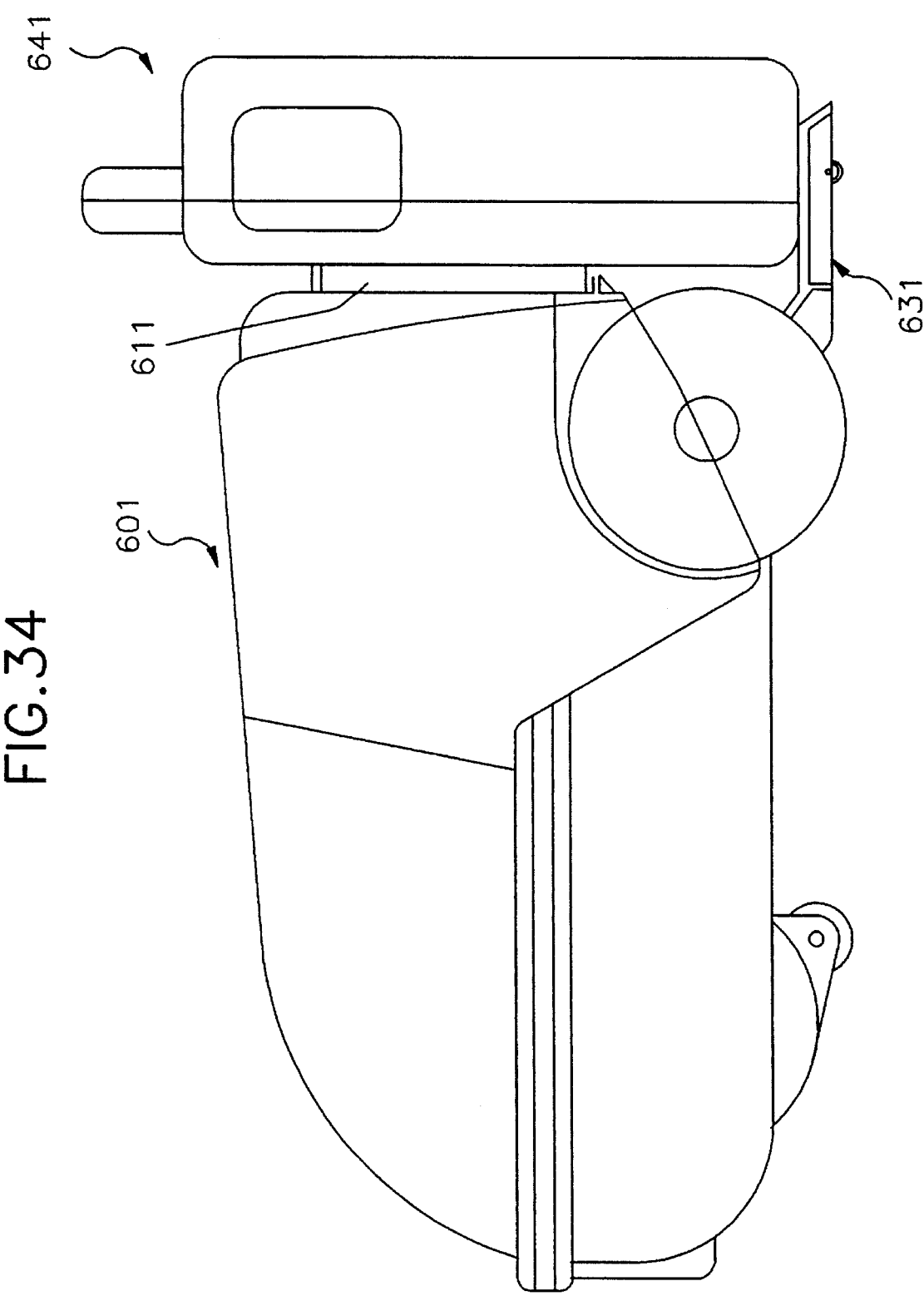
FIG. 34 is a schematic side elevation of a motor, on which a battery is installed, according to the embodiment shown in FIG. 26.

FIG. 34 shows the completion of the mounting in which the switching section 607 becomes in the connection-state, as shown in FIG. 27(A). That is, the first to fourth terminals T1 to T4 are connected to the first to fourth terminals Q1 to Q4, respectively. Accordingly, the first circuit consisting of the stator coil group 141, the first commutator 120 and the first armature coil 111 in series and the second circuit consisting of the second armature coil 112, the second commutator 130 and the second stator coil group 142 in series are now connected in parallel, and the first and second DC power terminals BQ1, BQ2 of the rear surface of the cleaner and the battery terminals B01, B02 of the front surface of the cleaner contact with each other to constitute the circuit as shown in FIG. 7. In addition, it is preferable that the cleaner equipped with the motor according to the present invention may be charged with AC power source when it is not used, by providing it with a battery chargeable circuit.

According to the present invention, when a high voltage power is supplied to the motor of the invention, the first stator coil group 141, the first brash 121, the first armature coil 111, the second brush 122, the third brush 131, the second armature coil 112, the fourth brush 132, the second stator coil group 142 are all connected in series, while when a low voltage power is supplied to the motor, the first circuit in which the first stator coil group 141, the first brush 121, the first armature coil 111 and the second brush 122 are connected with each other in series and the second circuit in which the third brush 131, the second armature coil 112, the fourth brush 132 and the second stator coil group 142 are connected in series are now connected in parallel with each other.

Accordingly, when low voltage is supplied to the vacuum cleaner, load between both power terminals is reduced to one half and the amount of turns of the first and second armature coils is the same regardless of DC or AC, whereby the torque of the motor according to the present invention is the same regardless that low voltage or high voltage is supplied thereto.

Therefore, the motor of the present invention can be so driven by DC power source by to generate the same output as AC power source of high voltage through using the small capacity of light battery, and is available for both DC and AC without using a separate adaptor or power circuit.

Also, as mentioned above, due to the function of the switching section in accordance with various embodiments of the invention, the circuit construction incorporated in the motor is changeable just by connecting the power cord to the electric equipment of the cleaner provided with such motor or installing the battery in the cleaner, thereby to provide the motor for use with high/low voltage. Further, the motor is operative by simple handling and is convenient for maintenance, carriage and storage.

Having now fully described the invention, it will be apparent to a person skilled in the art that many changes and modifications can be made thereto without departing from the spirit and scope of the invention as set forth therein.

What is claimed is:

1. A motor capable of using various voltages comprising:

a cylindrical armature having a plurality of slots formed at an outer surface thereof;

a rotation shaft passing through the center of the armature for rotating the armature;

a first and a second commutator disposed at the opposite ends of the rotation shaft in the opposite sides of the armature, and respectively including a first and a second plurality of commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit;

the second armature coil, the second commutator, and the second stator coil group being connected in series to form a second circuit, the first circuit being connected to the second circuit in series corresponding to a first voltage applied to the motor, and in parallel corresponding to a second voltage applied to the motor, which is lower than the first voltage; and switching means for connecting the first circuit and the second circuit in series corresponding to the first voltage, and in parallel corresponding to the second voltage, applied to the motor, wherein said switching means comprises:

a switch housing including a body section having a guiding protrusion formed at the center of the inner side thereof, and a receiving section formed incorporate with the body section to receive a plug of a cord for supplying high voltage power;

a switching member including a base plate having first and second conductors extending vertically and attached to opposite sides of the front surface thereof, and a third conductor extending horizontally and attached to a lower part of the rear surface thereof, a forward protrusion formed incorporated with the base plate and protruding forward from the base plate to be inserted into the receiving section to travel between a front position and a rear position in the receiving section, and a recess formed at the rear surface of the base plate into the forward protrusion, in which the guiding protrusion is inserted;

two plug terminals fixed by a holder disposed at the rear surface of the body section, and extending from the holder through the guiding protrusion, the recess, and the forward protrusion, in order, into the receiving section;

a spring disposed between the guiding protrusion and the bottom of the recess;

first, third, sixth terminals disposed at one side of the base plate, and respectively interconnected to the first stator coil group and one of the plug terminals, the third brush, and one electrode of power source of low voltage, the first and sixth terminals respectively having a front contact plate, and the third terminal having a front and a rear contact plate, whereby the rear contact plate of the third terminal is in contact with the third conductor of the switching member at the rear position thereof, and the front contact plates of the first, the third, and the sixth terminals are in contact with the first conductor of the switching member at the front position thereof to be electrically interconnected with each other; and second, fourth, and fifth terminals disposed at the other side of the base plate, and respectively interconnected to the second brush, the second stator coil group and the other of plug terminals, and the other electrode of power source of low voltage, the fourth and the fifth terminal respectively having a front contact plate, and the second terminal having a front and a rear contact plates, whereby the rear contact plate of the second terminal is in contact with the third conductor of the switching member at the rear position thereof to be electrically interconnected to the third terminal, and the front conduct plates of the second, fourth, and fifth terminals are in contact with the second conductor of the switching member at the front position thereof to be electrically interconnected each other.

2. A motor capable of using various voltages comprising:

a cylindrical armature having a plurality of slots formed at an outer surface thereof;

a rotation shaft passing through the center of the armature for rotating the armature;

a first and a second commutator disposed at the opposite ends of the rotation shaft in the opposite sides of the armature, and respectively including a first and a second plurality of commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit;

the second armature coil, the second commutator, and the second stator coil group being connected in series to form a second circuit, the first circuit being connected to the second circuit in series corresponding to a first voltage applied to the motor, and in parallel corresponding to a second voltage applied to the motor, which is lower than the first voltage; and switching means for connecting the first circuit and the second circuit in series corresponding to the first voltage, and in parallel corresponding to the second voltage, applied to the motor, wherein said switching means comprises:

an upper case including a plug receiving section formed thereon, two connector pins disposed in the plug receiving section to be connected with two terminals of a plug of a cord inserted into the plug receiving section to apply a high voltage of an external electric power between said two connector pins, a hole formed under the plug receiving section, and guiding grooves formed at the inner surfaces of the opposite sides of the upper case;

a lower case assembled with the upper case, and including guiding grooves formed at the inner surfaces of the opposite sides thereof respectively connected to the guiding grooves in the upper case;

a switching member disposed between the upper case and the lower case to travel between an upper position and a lower position, and including a transverse beam having openings formed therein, an upper protrusion protruding upward from the center of the transverse beam to be inserted into the hole, and having an inclined surface at the front upper corner thereof, and a snap section extending rearward from the center of the transverse beam, in which is fitted a spring for applying upward biasing force to the switching member;

first and second conductors separated from each other, and respectively including a front section of an electroconductive plate fixed at the lower case, and a rear section connected incorporated with the front section and having three legs separated from each other, said three legs respectively extending through the corresponding openings;

first, third, and sixth terminals disposed at the upper case, corresponding to each of said three legs of the first conductive plate, and respectively interconnected to the first stator coil group and one of the connector pins, the third brush, and one electrode of power source of low voltage, the first, third, and sixth terminals being in contact with said three legs of the first conductive plate of the switching member at the upper position thereof to be electrically interconnected with each other;

second, fourth, and fifth terminals disposed at the upper case, corresponding to each of said three legs of the second conductive plate, and respectively interconnected to the second brush, the second stator coil group and the other of the connector pins, and the other electrode of power source of low voltage, the second, fourth, and fifth terminals being in contact with said three legs of the second conductive plate of the switching member at the upper position thereof to be electrically interconnected with each other; and seventh and eighth terminals disposed at the lower case separated from each other, corresponding to two of said three legs of the first conductive plate, and respectively interconnected to the second and third terminals, the seventh and eighth terminals being in contact with the first conductive plate extending through the openings of the switching member at the lower position thereof, to be electrically interconnected with each other.

3. A motor capable of using various voltages comprising:

a cylindrical armature having a plurality of slots formed at an outer surface thereof;

a rotation shaft passing through the center of the armature for rotating the armature;

a first and a second commutator disposed at the opposite ends of the rotation shaft in the opposite sides of the armature, and respectively including a first and a second plurality of commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit;

the second armature coil, the second commutator, and the second stator coil group being connected in series to form a second circuit, the first circuit being connected to the second circuit in series corresponding to a first voltage applied to the motor, and in parallel corresponding to a second voltage applied to the motor, which is lower than the first voltage; and switching means for connecting the first circuit and the second circuit in series corresponding to the first voltage, and in parallel corresponding to the second voltage, applied to the motor, wherein said switching means comprises:

an outer plate having a knob opening and a first plug opening formed therein;

a switching member including a switching plate having a second plug opening, the longitudinal width of which is smaller than that of the first plug opening, and a stopper opening formed at the front of the second plug opening, the transverse width of which is larger than that of the second plug opening, a knob for moving the switching member between a front position and a rear position thereof, attached on a part of the switching plate in front of the stopper opening and inserted in the knob opening, first and second conductors attached at a front lower part of the switching plate, and a spring support plate attached at a front lower part of the switching plate behind the first and second conductors, the first plug opening being interconnected with the second plug opening of the switching member nearly before the rear position thereof;

a plug receiving member fixed to a boss disposed in the housing of the motor and including a stopper receiving recess and a plug receiving recess respectively formed at the front and rear sides thereof, a connecting slot intercommunicating the stopper receiving recess and the plug receiving recess with each other, and two connector pins fixed in the plug receiving recess to be inserted into a plug of a cord for supplying an outer electric current of high voltage for motor, the plug receiving recess being disposed under the switching plate, corresponding to the first plug opening;

a stopper including an actuator section inserted in the stopper receiving recess, the transverse width of which is larger than that of the second plug opening and smaller than that of the stopper opening, so as to be engaged in the stopper opening of the switch plate at the rear position thereof, an abutment section inserted in the plug receiving recess, a connecting section inserted in the connecting slot and connecting the actuator section and the abutment section incorporated with each other, and a stopper spring disposed between the actuator section and the bottom of the stopper receiving recess;

a spring disposed between the stopper and the spring support plate to apply a forward biasing force to the switching member;

first, third, and sixth terminals disposed at the front of the first conductor, and respectively interconnected to the first stator coil group and one of the connector pins, the third brush, and one electrode of a power source of low voltage, and being in contact with the first conductor of the switching member at the front position thereof to be electrically interconnected with each other;

second, fourth, and fifth terminals disposed at the front of the second conductor, and respectively interconnected to the second brush, the second stator coil group and the other of the connector pins, and the other electrode of a power source of low voltage, and being in contact with the second conductor of the switching member at the front position thereof to be electrically interconnected with each other; and seventh and eighth terminals disposed behind the first conductor, and respectively interconnected to the second and third terminals, and being in contact with the first conductor of the switching member at the rear position thereof to be electrically interconnected with each other.

4. A motor capable of using various voltages comprising:

a cylindrical armature having a plurality of slots formed at an outer surface thereof;

a rotation shaft passing through the center of the armature for rotating the armature;

a first and a second commutator disposed at the opposite ends of the rotation shaft in the opposite sides of the armature, and respectively including a first and a second plurality of commutator pieces, the numbers of which ore respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit;

the second armature coil, the second commutator, and the second stator coil group being connected in series to form a second circuit, the first circuit being connected to the second circuit in series corresponding to a first voltage applied to the motor, and in parallel corresponding to a second voltage applied to the motor, which is lower than the first voltage; and switching means for connecting the first circuit and the second circuit in series corresponding to the first voltage, and in parallel corresponding to the second voltage, applied to the motor, wherein said switching means comprises:

first and second direct current power terminals disposed at a rear surface of a cleaner body;

an inner case including first, second, third, and fourth inner terminals therein, the first and third inner terminals being interconnected with each other to be interconnected to the first direct current power terminal, and the second and fourth inner terminals being interconnected with each other to be interconnected to the second direct current power terminal;

an outer case forming a part of the rear surface of the cleaner body and assembled with the inner case, and including first, second, third, and fourth outer terminals, and a protrusion opening formed at the center thereof, the first and fourth terminals respectively connected to either terminals of a plug for supplying an alternating current power of high voltage for the motor, and the second and third terminals being interconnected with each other;

a switching member disposed between the inner case and the outer case to travel between a front position and a rear position thereof, and including first, second, third, and fourth terminals respectively disposed between each of the first to the fourth inner and outer terminals corresponding thereto, a base plate for holding the first to the fourth terminals separated from each other, a spring disposed between the base plate and the inner case to apply an outward biasing force to the switching member, and a protrusion extending outward through the protrusion opening from the base plate, the first, second, third, and fourth terminals respectively being connected to the first stator coil group, the second brush, the third brush, and the second stator coil group;

a plurality of rails formed at the rear surface of the body of the cleaner; and a battery having a plurality of suspension members, and first and second battery terminals disposed on a surface of a battery to be installed at the rear surface of the cleaner body, the plurality of suspension members being engaged in each of the plurality of rails, one of which is to be in contact with the protrusion to make the switching member in the cleaner body with the battery installed be positioned at the rear position thereof, and the first and second battery terminals respectively being in contact with the first and the second direct current power terminals at the rear surface of the cleaner body with the battery installed.

5. A motor capable of using various voltages as claimed in claim 4, wherein said switching means further comprises means for supporting a battery including a pivot pin hingedly attached at a lower rear corner of the cleaner body, a body section on which the battery is put on, one end of which is pivotally attached to the cleaner body, and the other end of which an inclined surface is formed in, and a support wheel disposed near the other end of the body section, whereby the battery rotates the body section by sliding along the inclined surface so as to be put on the body section.

6. A motor capable of using various voltages comprising:

a cylindrical armature having a plurality of slots formed at an outer surface thereof;

a rotation shaft passing through the center of the armature for rotating the armature;

first and second commutators disposed at the opposite ends of the rotation shaft in the opposite sides of the armature, and respectively including first and second commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit; and switching means for connecting a first circuit being formed of the first stator coil group, the first commutator, and the first armature coil, and the second circuit being formed of the second coil, the second commutator, and the second stator coil group, in series corresponding to the first voltage, and in parallel corresponding to the second voltage, applied to the motor, said switching means including a switch housing including a body section having a guiding protrusion formed at the center of the inner side thereof, and a receiving section formed incorporate with the body section to receive a plug of a cord for supplying high voltage power, a switching member including a base plate having first and second conductors extending vertically and attached to opposite sides of the front surface thereof, and a third conductor extending horizontally and attached to a lower part of the rear surface thereof, a forward protrusion formed incorporated with the base plate and protruding forward from the base plate to be inserted into the receiving section to travel between a front position and a rear position in the receiving section, and a recess formed at the rear surface of the base plate into the forward protrusion, in which the guiding protrusion is inserted into the recess, two plug terminals fixed by a holder disposed at the rear surface of the body section, and extending from the holder through the guiding protrusion, the recess, and the forward protrusion, in order, into the receiving section, a spring disposed between the guiding protrusion and the bottom of the recess, first, third, and sixth terminals disposed at one side of the base plate, and respectively interconnected to the first stator coil group and one of the plug terminals, the third brush, and one electrode of power source of low voltage, the first and sixth terminals respectively having a front contact plate, and the third terminal having a front and a rear contact plate, whereby the rear contact plate of the third terminal is in contact with the third conductor of the switching member at the rear position thereof, and the front contact plate of the first, third, and sixth terminals are in contact with the first conductor of the switching member at the front position thereof to be electrically interconnected with each other, and second, fourth, and fifth terminals disposed at the other side of the base plate, and respectively interconnected to the second brush, the second stator coil group and the other of the plug terminals, and the other electrode of power source of low voltage, the fourth and fifth terminals respectively having a front contact plate, and the second terminal having front and rear contact plates, whereby the rear contact plates of the second terminal are in contact with the third conductor of the switching member at the rear position thereof to be electrically interconnected to the third terminal, and the front conduct plates of the second, fourth, and fifth terminals are in contact with the second conductor of the switching member at the front position thereof to be electrically interconnected with each other.

7. A motor capable of using various voltages comprising:

a cylindrical armature having a plurality of slots formed at an outer surface thereof;

a rotation shaft passing through the center of the armature for rotating the armature;

first and second commutators disposed at the opposite ends of the rotation shaft in the opposite sides of the armature, and respectively including first and second commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit; and switching means for connecting a first circuit being formed of the first stator coil group, the first commutator, and the first armature coil, and the second circuit being formed of the second coil, the second commutator, and the second stator coil group, in series corresponding to the first voltage, and in parallel corresponding to the second voltage, applied to the motor, said switching means including an upper case including
a plug receiving section formed thereon, two connector pins disposed in the plug receiving section to be connected with two terminals of a plug of a cord inserted into the plug receiving section to apply a high voltage of an external electric power between said two connector pins, a hole formed under the plug receiving section, and guiding grooves formed at the inner surfaces of the opposite sides of the upper case, a lower case assembled with the upper case, and including guiding grooves formed at the inner surfaces of the opposite sides thereof respectively connected to the guiding grooves in the upper case, a switching member disposed between the upper case and the lower case to travel between an upper position and a lower position, and including a transverse beam having openings formed therein, an upper protrusion protruding upward from the center of the transverse beam to be inserted into the hole, and having an inclined surface at the front upper corner thereof, and a snap section extending rearward from the center of the transverse beam, in which is fitted a spring for applying upward biasing force to the switching member, first and second conductors separated from each other, and respectively including a front section of an electro-conductive plate fixed at the lower case, and a rear section connected incorporate with the front section and having three legs separated from each other, said three legs respectively extending through the corresponding opening, first, third, and sixth terminals disposed at the upper case, corresponding to each of said three legs of the first conductive plate, and respectively interconnected to the first stator coil group and one of the connector pins, the third brush, and one electrode of power source of low voltage, the first, third, and sixth terminals being in contact with said three legs of the first conductive plate of the switching member at the upper position thereof to be electrically interconnected with each other, second, fourth, and fifth terminals disposed at the upper case, corresponding to each of said three legs of the second conductive plate, and respectively interconnected to the second brush, the second stator coil group and the other of the connector pins, and the other electrode of power source of low voltage, the second, fourth, and fifth terminals being in contact with said three legs of the second conductive plate of the switching member at the upper position thereof to be electrically interconnected each other, and seventh and eighth terminals disposed at the lower plate separated from each other, corresponding to two of said three legs of the first conductive plate, and respectively interconnected to the second and third terminals, the seventh and eighth terminals being in contact with the first conductive plate extending through the openings of the switching member at the lower position thereof, to be electrically interconnected with each other.

8. A motor capable of using various voltages comprising:

a cylindrical armature having a plurality of slots formed at an outer surface thereof;

a rotation shaft passing through the center of the armature for rotating the armature;

first and second commutators disposed at the opposite ends of the rotation shaft in the opposite sides of the armature, and respectively including first and second commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit; and switching means for connecting a first circuit being formed of the first stator coil group, the first commutator, and the first armature coil, and the second circuit being formed of the second coil, the second commutator, and the second stator coil group, in series corresponding to the first voltage, and in parallel corresponding to the second voltage, applied to the motor, said switching means including an outer plate having a knob opening and a first plug opening formed therein, a switching member including a switching plate having a second plug opening, the longitudinal width of which is smaller than that of the first plug opening, and a stopper opening formed at the front of the second plug opening, the transverse width of which is larger than that of the second plug opening, a knob for moving the switching member between a front position and a rear position thereof, attached on a part of the switching plate in the front of the stopper opening and inserted in the knob opening, first and second conductors attached at a front lower part of the switching plate, and a spring support plate attached at a front lower part of the switching plate behind the first and second conductors the first plug opening being interconnected with second plug opening of the switching member closely before the rear position thereof, a plug receiving member fixed to a boss in the housing of the motor and including a stopper receiving recess and a plug receiving recess respectively formed at the front and rear sides thereof, a connecting slot intercommunicating the stopper receiving recess and the plug receiving recess with each other, and two connector pins fixed in the plug receiving recess to be inserted into a plug of a cord for supplying an external electric current of high voltage for motor, the plug receiving recess being disposed under the switching plate, corresponding to the first plug opening, a stopper including an actuator section inserted in the stopper receiving recess, the transverse width of which is larger than that of the second plug opening and smaller than that of the stopper opening, so as to be engaged in the stopper opening of the switch plate at the rear position thereof, an abutment section inserted in the plug receiving recess, a connecting section inserted in the connecting slot and connecting the actuator section and the abutment section incorporated with each other, and a stopper spring disposed between the actuator section and the bottom of the stopper receiving recess, a spring disposed between the stopper and the spring support plate to apply a forward biasing force to the switching member, first, third, and sixth terminals disposed at the front of the first conductor, and respectively interconnected to the first stator coil group and one of the connector pins, the third brush, and one electrode of a power source of low voltage, and being in contact with the first conductor of the switching member at the front position thereof to be electrically interconnected with each other, second, fourth, and fifth terminals disposed at the front of the second conductor, and respectively interconnected to the second brush, the second stator coil group and the other of the connector pins, and the other electrode of a power source of low voltage, and being in contact with the second conductor of the switching member at the front position thereof to be electrically interconnected with each other, and seventh and eighth terminals disposed behind the first conductor, and respectively interconnected to the second and third terminals, and being in contact with the first conductor of the switching member at the rear position thereof to be electrically interconnected with each other.

9. A motor capable of using various voltages comprising:

a cylindrical armature having a plurality of slots formed at an outer surface thereof;

a rotation shaft passing through the center of the armature for rotating the armature;

first and second commutators disposed at the opposite ends of the rotation shaft in the opposite sides of the armature, and respectively including first and second commutator pieces, the numbers of which are respectively corresponding to that of the slots of the armature;

first and second armature coils wound in the armature slots respectively through the first and the second commutator pieces in a double-winding-back-alpha type;

first and second brushes disposed at the opposite sides of the first commutator and being in contact with the first commutator pieces, and third and fourth brushes disposed at the opposite sides of the second commutator and being in contact with the second commutator pieces;

first and second stator coil groups wound on stators fixed at the housing of the motor, and respectively interconnected to the first and second brushes, the first stator coil group, the first commutator, and the first armature coil being connected in series to form a first circuit; and switching means for connecting a first circuit being formed of the first stator coil group, the first commutator, and the first armature coil, and the second circuit being formed of the second coil, the second commutator, and the second stator coil group, in series corresponding to the first voltage, and in parallel corresponding to the second voltage, applied to the motor, said switching means including first and second direct current power terminals disposed at a rear surface of a cleaner body, an inner case including first, second, third, and fourth inner terminals therein, the first and third inner terminals being interconnected with each other to be interconnected to the first direct current power terminal, and the second and fourth inner terminals being interconnected with each other to be interconnected to the second direct current power terminal, an outer case forming the rear part of a surface of the cleaner body and assembled with the inner case, and including first, second, third, and fourth outer terminals, and a protrusion opening formed at the center thereof, the first and fourth terminals respectively connected to either terminals of a plug for supplying an alternating current power of high voltage for the motor, and the second and third terminal being interconnected with each other, a switching member disposed between the inner case and the outer case to travel between a front position and a rear position thereof, and including first, second, third, and fourth terminals respectively disposed between each of the first to the fourth inner and outer terminals corresponding thereto, a base plate for holding the first to the fourth terminals separated from each other, a spring disposed between the base plate and the inner case to apply an outward biasing force to the switching member, and a protrusion extending outward through the protrusion opening from the base plate, the first, second, third, and fourth terminals respectively being connected to the first stator coil group, the second brush, the third brush, and the second stator coil group, a plurality of rails formed at the rear surface of the cleaner; and a battery having a plurality of suspension members and first and second battery terminals disposed on a surface of a battery to be installed at the rear surface of the cleaner body, the plurality of suspension members being engaged in each of the plurality of rails, one of which is to be in contact with the protrusion to make the switching member in the cleaner body with the battery installed be positioned at the rear position thereof, and the first and the second battery terminals respectively being in contact with the first and the second direct current power terminals at the rear surface of the cleaner body with the battery installed.

* * * * *